(12) United States Patent
Wang

(10) Patent No.: US 12,437,866 B2
(45) Date of Patent: Oct. 7, 2025

(54) SYSTEMS AND METHODS FOR CONTROLLING MEDICAL DEVICE

(71) Applicant: SHANGHAI UNITED IMAGING HEALTHCARE CO., LTD., Shanghai (CN)

(72) Inventor: Xukun Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

(21) Appl. No.: 18/357,151

(22) Filed: Jul. 23, 2023

(65) Prior Publication Data
US 2024/0021300 A1 Jan. 18, 2024

Related U.S. Application Data

(63) Continuation of application No. PCT/CN2021/087968, filed on Apr. 18, 2021.

(51) Int. Cl.
*G16H 40/60* (2018.01)
*G06F 3/01* (2006.01)
*G06F 3/02* (2006.01)
*G06F 3/0346* (2013.01)

(52) U.S. Cl.
CPC ............ *G16H 40/60* (2018.01); *G06F 3/016* (2013.01); *G06F 3/02* (2013.01); *G06F 3/0346* (2013.01)

(58) Field of Classification Search
CPC ........ G06F 3/017; G06F 3/011; G06F 3/0304; G06F 3/0346; G06F 3/0482; G06F 3/14
See application file for complete search history.

(56) References Cited

U.S. PATENT DOCUMENTS

| | | |
|---|---|---|
| 2010/0231509 A1 | 9/2010 | Boillot et al. |
| 2011/0288853 A1 | 11/2011 | Butzine et al. |
| 2012/0198392 A1 | 8/2012 | Halbert et al. |
| 2015/0138075 A1 | 5/2015 | Nakasu et al. |
| 2016/0378938 A1 | 12/2016 | Kuhrt et al. |
| 2020/0012324 A1* | 1/2020 | Sung ............... G06F 1/1652 |
| 2020/0053651 A1* | 2/2020 | Lee ...................... G06F 3/16 |
| 2020/0264684 A1* | 8/2020 | Na ................. H04M 1/72454 |
| 2021/0041912 A1* | 2/2021 | Eom ............... H04M 1/0216 |
| 2022/0084249 A1* | 3/2022 | Chen .............. G01C 21/1656 |

(Continued)

FOREIGN PATENT DOCUMENTS

| | | |
|---|---|---|
| CN | 102495768 A | 6/2012 |
| CN | 104777959 A | 7/2015 |

(Continued)

OTHER PUBLICATIONS

International Search Report in PCT/CN2021/087968 mailed on Jan. 12, 2022, 7 pages.

*Primary Examiner* — Van N Chow
(74) *Attorney, Agent, or Firm* — METIS IP LLC

(57) ABSTRACT

The present disclosure may relate to methods and systems for controlling a medical device. The method may include: obtaining a first user input; determining whether the first user input satisfies a trigger condition; in response to determining that the first user input satisfies the trigger condition, causing a control device to enter a control state; obtaining a tilt state of the control device; and controlling, based on the tilt state, a motion state of at least one component of the medical device.

20 Claims, 9 Drawing Sheets

(56) References Cited

U.S. PATENT DOCUMENTS

| | | | | |
|---|---|---|---|---|
| 2022/0266691 A1* | 8/2022 | Laitsaari | ................ | A61B 5/165 |
| 2022/0409298 A1* | 12/2022 | Haider | ................... | A61B 34/37 |
| 2023/0015672 A1* | 1/2023 | Kim | ................... | H04M 1/0214 |
| 2023/0035624 A1* | 2/2023 | Berlinger | .............. | A61B 5/7289 |
| 2023/0049441 A1* | 2/2023 | Yuan | ................... | G08B 21/043 |

FOREIGN PATENT DOCUMENTS

| | | |
|---|---|---|
| CN | 204925994 U | 12/2015 |
| CN | 105373317 A | 3/2016 |
| CN | 107961022 A | 4/2018 |
| EP | 3600042 B1 | 1/2024 |

\* cited by examiner

SYSTEMS AND METHODS FOR CONTROLLING MEDICAL DEVICE

CROSS-REFERENCE TO RELATED APPLICATION

This application is a continuation of International Application No. PCT/CN2021/087968, filed on Apr. 18, 2021, the contents of which are hereby incorporated by reference.

TECHNICAL FIELD

The present disclosure generally relates to a medical system and method, and more particularly, to systems and methods for controlling a radiotherapy device.

BACKGROUND

A medical device has been widely applied in a clinical examination and a medical diagnosis. When using the medical device to image or treat a patient, a user (e.g., a doctor) needs to control motion states (e.g., a motion direction, a motion speed) of one or more components of the medical device. For example, a radiotherapy device is usually equipped with a control device (e.g., a hand control box), and the user may control the motion states of the components (e.g., a treatment bed, a gantry, a collimator) of the radiotherapy device via the control device. Generally, the smaller a volume of the control device is, the more convenient the user's operation is, and the user expects to perform a blind operation without looking at the control device.

SUMMARY

In a first aspect of the present disclosure, a method for controlling a medical device may be provided, including: obtaining a first user input; determining whether the first user input satisfies a trigger condition; in response to determining that the first user input satisfies the trigger condition, causing a control device to enter a control state; obtaining a tilt state of the control device; and controlling, based on the tilt state, a motion state of at least one component of the medical device, wherein the motion state may include a motion direction and/or a motion speed.

In some embodiments, the control device may include at least one first key. The determining whether the first user input satisfies a trigger condition may include: determining whether the first user input is a selection of the at least one first key.

In some embodiments, the control device may include at least one second key. The controlling, based on the tilt state, the motion state of the at least one component of the medical device may include: obtaining a second user input for selecting at least one of the at least one second key; and controlling, based on the second user input and the tilt state, the motion state of the at least one component of the medical device.

In some embodiments, the tilt state may include a tilt direction and/or a tilt angle. The controlling, based on the second user input and the tilt state, the motion state of the at least one component of the medical device may include: determining, based on the second user input and the tilt direction, the motion direction of the at least one component; and/or determining, based on the second user input and the tilt angle, the motion speed of the at least one component.

In some embodiments, the determining, based on the second user input and the tilt angle, the motion speed of the at least one component may include: determining whether the tilt angle is greater than or equal to an angle threshold; and in response to determining that the tilt angle is greater than or equal to the angle threshold, determining the motion speed of the at least one component as a preset speed.

In some embodiments, the control device may include a vibration device, and the motion speed of the at least one component may be represented by a vibration frequency and/or a vibration amplitude of the vibration device.

In some embodiments, the in response to determining that the first user input satisfies the trigger condition, causing a control device to enter the control state may include: determining whether the control device is in an initial state; and in response to the determining that the control device is in the initial state and the first user input satisfies the trigger condition, causing the control device to enter the control state.

In some embodiments, the controlling, based on the tilt state, the motion state of the at least one component of the medical device may include: obtaining a state of the control device at a time of the first user input as a reference state; determining the tilt state of the control device based on the reference state; and controlling the motion state of the at least one component of the medical device based on the tilt state.

In some embodiments, the control device may include an inertial sensor. The obtaining the tilt state of the control device may include: obtaining detection data of the inertial sensor; and determining the tilt state of the control device based on the detection data.

In some embodiments, the medical device may be a radiotherapy device. The radiotherapy device may include a treatment bed, a gantry, and a collimator. The motion state of the at least one component of the radiotherapy device may include at least one of the following: a translation motion state of the treatment bed along a first axis, a translation motion state of the treatment bed along a second axis, a translation motion state of the treatment bed along a third axis, a rotation motion state of the treatment bed around a rotation axis of the treatment bed, a rotation motion state of the gantry around a rotation axis of the gantry, or a rotation motion state of the collimator around a rotation axis of the collimator.

In a second aspect of the present disclosure, a medical system may be provided, including: a medical device, a control device, at least one processor, and at least one storage medium. The medical device may include at least one component. The control device may include at least one inertial sensor. The at least one storage medium may be used to store an instruction, and when the instruction is executed, the at least one processor may cause the system to perform the following operations: obtaining, by the inertial sensor, a tilt state of the control device; and controlling a motion state of the at least one component of the medical device based on the tilt state, wherein the motion state may include a motion direction and/or a motion speed.

In some embodiments, the control device may include at least one first key. The at least one processor may further cause the system to perform the following operations: in response to determining that a user selects the at least one first key, causing the control device to enter a control state.

In some embodiments, the control device may include at least one second key. The at least one processor may further cause the system to perform the following operations: in response to determining that a user selects at least one of the at least one second key, determining at least one motion of at least one component to be controlled from the at least one component; and controlling, based on the tilt state, the motion state of the at least one motion of the at least one component to be controlled.

In some embodiments, the tilt state may include a tilt direction and/or a tilt angle. To control, based on the tilt state, the motion state of the at least one motion of the at least one component to be controlled, the at least one processor may cause the system to perform the following operations: determining, based on the tilt direction, a motion direction of the at least one motion of the at least one component to be controlled; and/or determining, based on the tilt angle, the motion speed of the at least one motion of the at least one component to be controlled.

In some embodiments, the inertial sensor may include an acceleration sensor or a gyroscope.

In some embodiments, the control device may include a vibration device. The vibration frequency and/or the vibration amplitude of the vibration device may be related to the tilt state of the control device.

In some embodiments, the control device may include the vibration device. The vibration frequency and/or the vibration amplitude of the vibration device may be proportional to the motion speed of the at least one component.

In some embodiments, the control device may have a single-motion mode. In the single-motion mode, the control device may control the motion state of a corresponding component along a single axis direction at a time.

In some embodiments, the control device may have a multi-motion mode. In the multi-motion mode, the control device may control the motion states of multiple motions of multiple corresponding components, or the motion states of multiple motions of a component along multiple axis directions at a time.

In a third aspect of the present disclosure, a control device may be provided, including: an inertial sensor, a display device, at least one first key, and at least one second key. The at least one first key may be configured to cause the control device to enter a control state. The at least one second key may be configured to select a motion of the at least one component of the medical device to be controlled.

In some embodiments, the at least one first key and/or the at least one second key may be a physical key or a touch key.

In some embodiments, the control device may enter the control state when the at least one first key is selected.

In some embodiments, the display device may display a first interface. The first interface may include at least one icon to be selected. The at least one icon to be selected may correspond to the at least one second key.

In some embodiments, when at least one of the at least one second key is selected, the display device may display a second interface. The second interface may be configured to indicate the motion of the at least one component to be controlled of the medical device.

In some embodiments, the inertial sensor may include an acceleration sensor or a gyroscope.

In some embodiments, the control device may include a vibration device. The vibration frequency and/or the vibration amplitude of the vibration device may be related to the tilt state of the control device.

In some embodiments, the control device may include a vibration device. The vibration frequency and/or the vibration amplitude of the vibration device may be proportional to the motion speed of the at least one component to be controlled.

In some embodiments, the control device may have a single-motion mode. In the single-motion mode, the control device may control the motion state of a corresponding component along a single axis direction at a time.

In some embodiments, the control device may have a multi-motion mode. In the multi-motion mode, the control device may control motion states of multiple motions of multiple corresponding components, or motion states of multiple motions of a component along multiple axis directions at a time.

In some embodiments, the control device may be a handheld device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

To more clearly illustrate the technical solutions related to the embodiments of the present disclosure, brief introduction of the drawings referred to the description of the embodiments is provided below. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "includes," when used herein, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Figure 2:
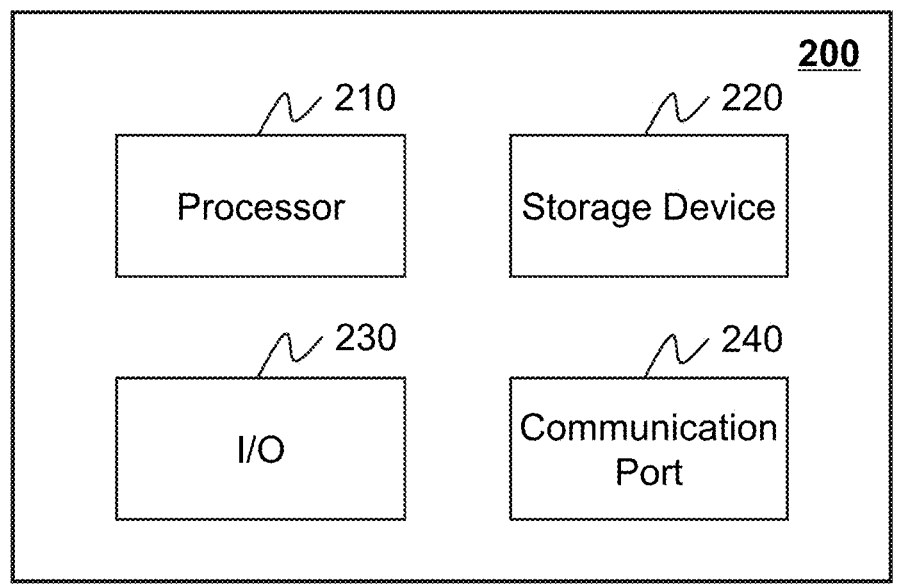
FIG. 2 is a schematic diagram illustrating an exemplary computing device on which at least a part of a medical system may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., a processor 210 as shown in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, an engine, a module or a block is referred to as being "on," "connected to" or "coupled to" another unit, engine, module or block, they may be directly on the other units, engines, modules, or blocks, or may communicate with the other units, engines, modules, or blocks, or there may be intermediate units, engines, modules, or blocks. In the present disclosure, the term "and/or" include any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts are used in the present disclosure to illustrate the operations performed by the system according to embodiments of the present disclosure. It should be understood that the preceding or following operations are not necessarily performed in precise order. Instead, the various operations may be processed in reverse order or simultaneously. It is also possible to add other operations to the flowcharts or to remove one or more operations from the flowcharts.

Figure 1:
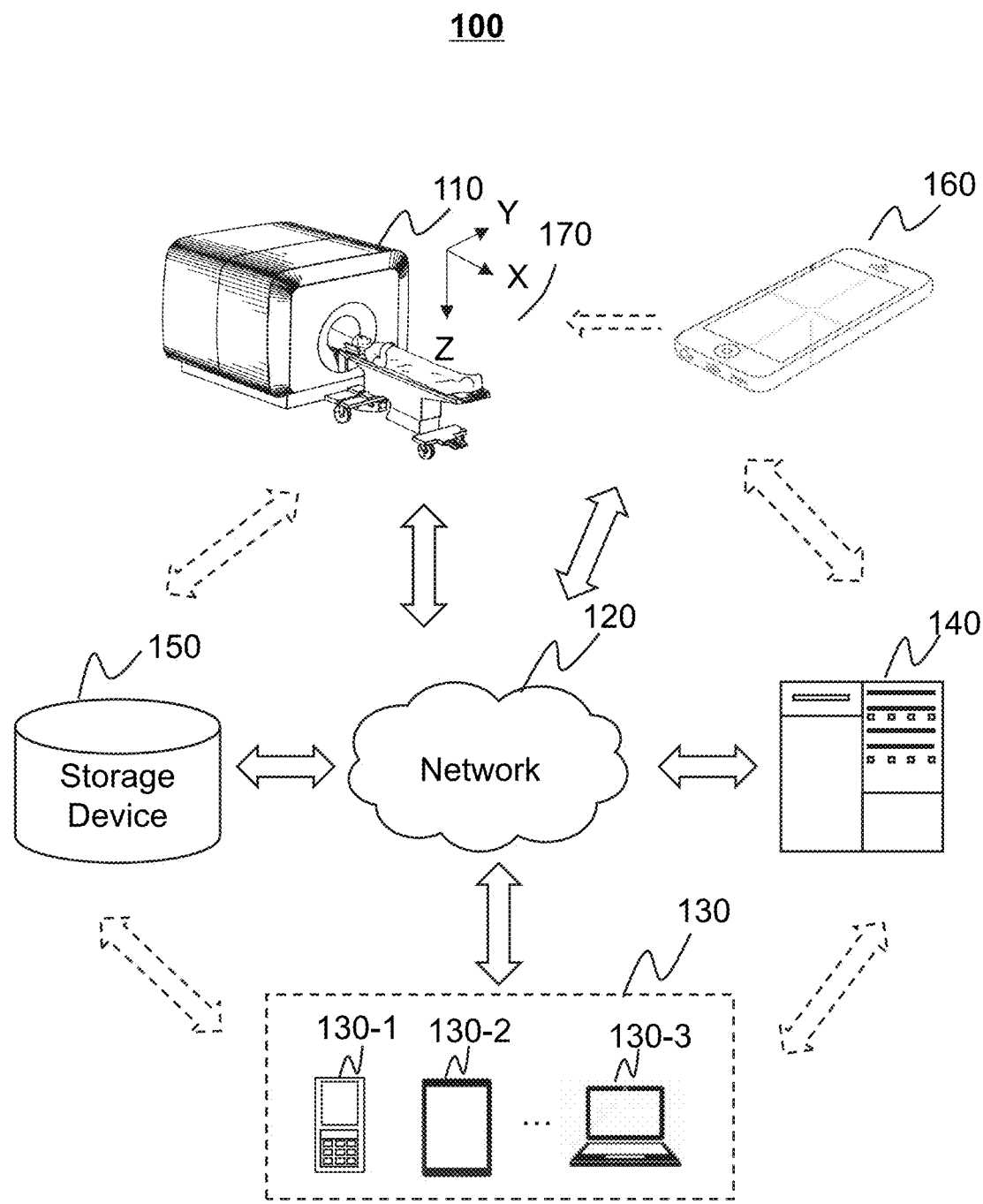
FIG. 1 is a schematic diagram illustrating an exemplary medical system according to some embodiments of the present disclosure.

In a current radiotherapy system, a radiotherapy device may usually be equipped with a control device (e.g., a hand control box), and a user (e.g., a doctor) may control motion states of components of the radiotherapy device (e.g., a rotation motion of a gantry, a rotation motion of a collimator, a rotation motion of a treatment bed, a translation motion of a treatment bed) through the hand control box. Generally, a handle of the hand control box may have a group of keys or toggle buttons, and each key or toggle button may correspond to a motion of a certain component of the radiotherapy device along a certain axis. For example, six toggle buttons may be set on the handle of the hand control box, which may correspond to a rotation motion of a gantry around a rotation axis of the gantry, a rotation motion of a collimator around a rotation axis of the collimator, a rotation motion of a treatment bed around a rotation axis of the treatment bed, a translation motion of the treatment bed along a first direction (e.g., an X-axis direction as shown in FIG. 1), a translation motion of the treatment bed along a second direction (e.g., a Y-axis direction as shown in FIG. 1), and a translation motion of the treatment bed along a third direction (e.g., a Z-axis direction as shown in FIG. 1), respectively.

When in use, the user may toggle the toggle buttons to control different motions. The left and right directions of each toggle button may correspond to two motion directions of a component along the axis. A stroke and a motion speed of the toggle button may have a linear relationship, that is, the greater the distance the toggle button is moved, the greater the motion speed of the corresponding component along the axis is. However, a disadvantage of the above design may be that it is difficult to know which toggle button is pressed by the thumb without a visual confirmation, which is not conducive to a blind operation of the user. When the user operates with one hand, it may be difficult to control the motion states of multiple components at the same time with only one hand. In addition, since the toggle button is a mechanical component, the probability of failure may be relatively high, which may cause unexpected component to move and may lead to danger. Due to a great volume of the toggle button, it may be uneasy to minimize the hand control box, and a cost of the toggle button may be relatively high.

The present disclosure may mainly provide a control device for controlling a medical device (e.g., a radiotherapy device). An inertial sensor may be used to replace functions of at least part of the mechanical moving components, such as the toggle buttons, on the control device. The user may only need to control a tilt direction and a tilt angle of the control device to control the motion state (e.g., the motion direction, the motion speed) of the component of the medical device. Specifically, the processing device (or the control device) may obtain a first user input. The processing device (or the control device) may determine whether the first user input satisfies a trigger condition. In response to determining that the first user input satisfies the trigger condition, the processing device (or the control device) may cause the control device to enter a control state. The processing device (or the control device) may obtain the tilt state of the control device. The processing device (or the control device) may control the motion state of at least one component of the medical device based on the tilt state.

By using the control device provided by the present disclosure, the user may no longer need to confirm the mechanical moving component, such as the toggle button, with the naked eyes, but may only need to control the tilt direction and the tilt angle of the control device to control the motion state of the components of the medical device, which is convenient for the user to perform the blind operation. Accordingly, the medical device can be controlled conveniently and accurately. In addition, the existing inertial sensor may have a high degree of integration, and corresponding functions may be realized by integrating the inertial sensor on a main board of the control device. The volume of the hand control box may be relatively small. In addition, since the control device reduces or does not have the mechanical moving component such as the toggle button, a service life of the control device may be extended.

FIG. 1 is a schematic diagram illustrating an exemplary medical system according to some embodiments of the present disclosure. A medical system 100 may include a medical device 110, a network 120, one or more terminals 130, a processing device 140, a storage device 150, and a control device 160. Components of the medical system 100 may be connected in various ways. Merely by way of example, the medical device 110 may be connected to the control device 160 directly (as indicated by the bi-directional arrow in dotted lines linking the medical device 110 and the control device 160), or through the network 150. As yet another example, the control device 160 may be connected to the processing device 140 directly (as indicated by the bi-directional arrow in dotted lines linking the control device 160 and the processing device 140), or through the network 150. As yet another example, the storage device 150 may be connected to the medical device 110 directly (as indicated by the bi-directional arrow in dotted lines linking the storage device 150 and the medical device 110), or through the network 150. As yet another example, the terminal 130 may be connected to the processing device 140 directly (as indicated by the bi-directional arrow in dotted lines linking the terminal 130 and the processing device 140), or through the network 150. As yet another example, the terminal 130 may be connected to the storage device 150 directly (as indicated by the bi-directional arrow in dotted lines linking the terminal 130 and the storage device 150), or through the network 150.

The medical device 110 may image and/or treat a subject. In some embodiments, the subject may include a biological subject and/or a non-biological subject. For example, the subject may include a specific part of a human body, such as the head, the chest, the abdomen, or the like, or any combination thereof. As another example, the subject may be a patient to be scanned by the medical device 110.

In some embodiments, the medical device 110 may be a medical imaging device or a treatment device for disease diagnosis or research purposes. In some embodiments, the medical device 110 may include a single modality device, for example, an X-ray therapy device, a Co-60 teletherapy device, a medical electron accelerator, an ultrasound device, an X-ray device, a computed tomography (CT) device, a magnetic resonance imaging (MRI) device, an ultrasound inspection device, a positron emission tomography (PET) device, an optical coherence tomography (OCT) device, an ultrasound (US) device, an intravascular ultrasound (IVUS) device, a near infrared spectroscopy (NIRS) device, a far infrared (FIR) device, or the like, or any combination thereof. In some embodiments, the medical device 110 may be a multi-modality (e.g., a dual-modality) device. For example, the medical device 110 may include an image-guided radiotherapy (IGRT) device. For example, the medical device 110 may be a CT-guided radiation therapy device, an MRI-guided radiation therapy device, etc. As another example, the medical device 110 may include an X-ray imaging-magnetic resonance imaging (X-ray-MRI) scanner, a positron emission tomography-X-ray imaging (PET-X-ray) scanner, a single photon emission computed tomography-magnetic resonance imaging (SPECT-MRI) scanner, a positron emission tomography-computed tomography (PET-CT) scanner, a digital subtraction angiography-magnetic resonance imaging (DSA-MRI) scanner, etc. The devices provided above are for illustration purposes only and are not intended to limit the scope of the present disclosure. As used herein, the term "imaging modality" or "modality" refers broadly to an imaging mode or technique that collects, generates, processes, and/or analyzes imaging information of a target subject.

In some embodiments, the medical system 100 may include a radiotherapy component, such as a treatment head. The treatment head may be connected to a gantry. In some embodiments, the treatment head may move with the motion (e.g., the rotation) of the gantry. The treatment head may include a target, a treatment radiation source, and a collimator. The treatment radiation source may emit a radiation beam to the subject. The collimator may include a primary collimator and a secondary collimator. The secondary collimator may include a multi-leaf collimator, a tungsten gate, etc.

In some embodiments, the medical device 110 may include a radiotherapy auxiliary device, such as an electronic portal imaging device (EPID). The EPID may generate an image of a subject before, during, and/or after the treatment. the EP ID may include a detector for detecting the radiation (e.g., X-rays, y-rays) emitted from the treatment radiation source. In some embodiments, the detector may include one or more detection units. The detection unit may include a scintillation detector (e.g., a cesium iodide detector, a gadolinium oxysulfide detector), a gas detector, etc. The detection unit may include a single-row detector or a multiple-row detector.

The network 120 may include any suitable network that can facilitate the exchange of information and/or data for the medical system 100. In some embodiments, one or more components (e.g., the medical device 110, the terminal 130, the processing device 140, the storage device 150) of the medical system 100 may communicate information and/or data with one or more other components of the medical system 100 via the network 120. For example, the processing device 140 may obtain image data from the medical device 110 via the network 120. As another example, the processing device 140 may obtain a user instruction from the terminal 130 via the network 120. As another example, the processing device 140 may send a treatment queue, patient information, etc. to the control device 160 for display to the user via the network 120. As another example, the processing device 140 may send a mechanical parameter, a hardware state, etc. of the component of the medical device 110 to the control device 160 for display to the user via the network 120. The network 120 may be and/or include a public network (e.g., the Internet), a private network (e.g., a local area network (LAN), a wide area network (WAN)), a wired network (e.g., a wireless LAN), an Ethernet network, a wireless network (e.g., a 802.11 network, a Wi-Fi network), a cellular network (e.g., a long term evolution (LTE) network), a gantry relay network, a virtual private network ("VPN"), a satellite network, a telephone network, a router, a hub, a switch, a server computer, and/or any combination thereof. Merely by way of example, the network 120 may include a cable network, a wired network, a fiber optic network, a telecommunications network, an intranet, a wireless local area network (WLAN), a metropolitan area network (MAN), a public switched telephone network (PSTN), a Bluetooth network, a ZigBee network, a near field communication (NFC) network, or the like, or any combination thereof. In some embodiments, network 120 may include one or more network access points. For example, the network 120 may include wired and/or wireless network access points such as base stations and/or Internet exchange points, and one or more components of the medical system 100 may be connected to the network 120 via the wired and/or wireless access points to exchange data and/or information.

Figure 3:
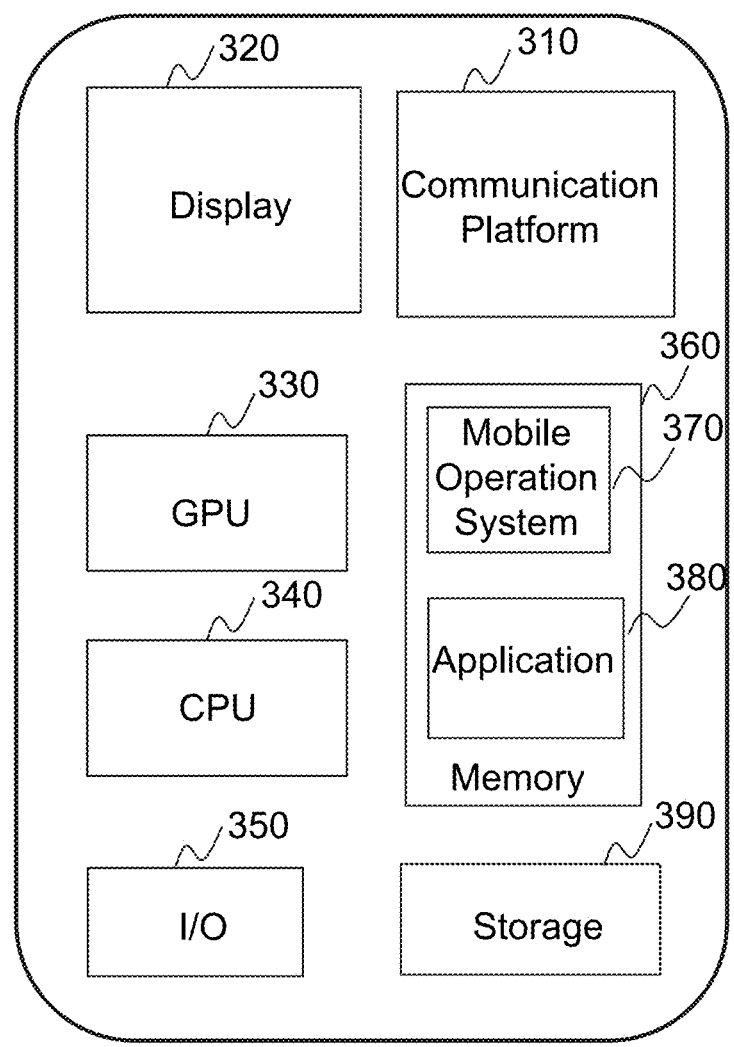
FIG. 3 is a schematic diagram illustrating exemplary hardware and/or software components of an exemplary mobile device on which a terminal may be implemented according to some embodiments of the present disclosure.

The terminal 130 may include a mobile device 130-1, a tablet computer 130-2, a laptop computer 130-3, or the like, or any combination thereof. In some embodiments, the mobile device 130-1 may include an intelligent home device, a wearable device, an intelligent mobile device, a virtual reality device, an augmented reality device, or the like, or any combination thereof. Merely by way of example, the terminal 130 may include a mobile device as shown in FIG. 3. In some embodiments, the intelligent home device may include an intelligent lighting device, an intelligent appliance control device, an intelligent monitoring device, an intelligent TV, an intelligent camera, a walkie-talkie, or the like, or any combination thereof. In some embodiments, the wearable device may include a bracelet, a footwear, glasses, a helmet, a watch, a clothing, a backpack, an intelligent accessory, or the like, or any combination thereof. In some embodiments, the mobile device may include a mobile phone, a personal digital assistant (PDAs), a gaming device, a navigation device, a point-of-sale (POS) device, a laptop, a tablet, a desktop, or the like, or any combination thereof. In some embodiments, the virtual reality device and/or the augmented reality device may include a virtual reality helmet, virtual reality glasses, a virtual reality blindfold, an augmented reality helmet, augmented reality glasses, an augmented reality blindfold, or the like, or any combination thereof. For example, the virtual reality device and/or the augmented reality device may include Google Glass™, Oculus Rift™, Hololens™, Gear VR™, etc. In some embodiments, the one or more terminals 130 may be a part of the processing device 140.

The processing device 140 may process data and/or information obtained from the medical device 110, the terminal 130, the control device 160, and/or the storage device 150. For example, the processing device 140 may include a first processing device and a second processing device. The first processing device may send data such as the treatment queue and the patient information to the control device 160 via the Ethernet according to a TCP/IP protocol. The second processing device may send information such as the mechanical parameter and the hardware state of the components of the medical device 110 to the control device 160 via the Ethernet according to the TCP/IP protocol. The application running on the control device 160 may display the data to the user. In some embodiments, the processing device 140 may be a single server or a server group. The server group may be centralized or distributed. In some embodiments, the processing device 140 may be a local or remote component relative to one or more other components of the medical system 100. For example, the processing device 140 may access information and/or data stored in the medical device 110, the terminal 130, the control device 160, and/or the storage device 150 via the network 120. As another example, the processing device 140 may be directly connected to the medical device 110, the terminal 130, the control device 160, and/or the storage device 150 to access the stored information and/or data. In some embodiments, the processing device 140 may be implemented on a cloud platform. Merely by way of example, the cloud platform may include a private cloud, a public cloud, a hybrid cloud, a community cloud, a distributed cloud, an internal cloud, a multi-layer cloud, or the like, or any combination thereof. In some embodiments, the processing device 140 may be implemented by a computing device 200 with one or more components as shown in FIG. 2.

The storage device 150 may store data, instructions, and/or any other information. In some embodiments, the storage device 150 may store data obtained from the terminal 130, the control device 160, and/or the processing device 140. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a compact disk, a magnetic tape, etc. Exemplary volatile read-and-write memory may include a random-access memory (RAM). Exemplary RAM may include a dynamic random-access memory (DRAM), a double data rate synchronous dynamic random-access memory (DDR SDRAM), a static random-access memory (SRAM), a thyristor random access memory (T-RAM), a zero capacitive random-access memory (Z-RAM), etc. Exemplary ROM may include a mask ROM (MROM), a programmable ROM (PROM), an erasable programmable ROM (EPROM), an electrically erasable programmable ROM (EEPROM), a compact disc ROM (CD-ROM), a digital multi-function disk ROM, etc. In some embodiments, the storage device 150 may be implemented on the cloud platform. Merely by way of example, the cloud platform may include the private cloud, the public cloud, the hybrid cloud, the community cloud, the distributed cloud, the internal cloud, the multi-layer cloud, or the like, or any combination thereof.

In some embodiments, the storage device 150 may be connected to the network 120 to communicate with one or more other components (e.g., the processing device 140, the terminal 130, the control device 160) of the medical system 100. One or more components of the medical system 100 may access data or instructions stored in the storage device 150 via the network 120. In some embodiments, the storage device 150 may be directly connected to or communicate with the one or more other components (e.g., the processing device 140, the terminal 130, the control device 160) of the medical system 100. In some embodiments, the storage device 150 may be a part of the processing device 140.

The control device 160 may control the medical device 110. For example, a user (e.g., a doctor) of the medical system 100 may control motion states of one or more components of the medical device 110 through the control device 160. In some embodiments, the control device 160 may be integrated into the terminal 130.

In some embodiments, the control device 160 may include an inertial sensor. The inertial sensor may be a sensor that detects and measures an acceleration, a tilt, a shock, a vibration, a rotation, and a multi-degree-of-freedom motion. The inertial sensor may include an acceleration sensor, a gyroscope, etc. The acceleration sensor may include a piezoresistive acceleration sensor, a piezoelectric acceleration sensor, a capacitive acceleration sensor, etc. The acceleration sensor may include an analog acceleration sensor, a digital acceleration sensor, etc. In some embodiments, the acceleration sensor may include a three-axis acceleration sensor. The three-axis acceleration sensor may be a sensor configured to measure a spatial acceleration, that is, to measure a change of a speed of an object in a space. For example, the three-axis acceleration sensor may measure accelerations of the object in three axes. The gyroscope may be an angular motion detecting device that uses a momentum moment sensitive housing of a high-speed rotating body to orbit the one or two axes orthogonal to the rotating shaft with respect to the inertial space.

In some embodiments, the control device 160 may include a vibration device. The vibration device may include a motor, a haptic device, etc. The haptic device may be a device that can accurately record a displacement process at multiple freedom degrees and convert it into an electrical signal. The motor may include a linear motor. The linear motor may be a transmission device that directly converts electrical energy into mechanical energy of a linear motion. In some embodiments, the vibration device may be configured to generate a vibration. For example, the vibration device may vibrate up and down. In some embodiments, detection data of the inertial sensor may be related to a vibration frequency and/or a vibration amplitude generated by the vibration device. For example, the frequency and the amplitude of the vibration generated by the vibration device may be determined based on the detection data of the inertial sensor. As another example, a value of a gravitational acceleration of the control device 160 in the detection data of the inertial sensor may be proportional to the vibration frequency or the vibration amplitude generated by the motor.

Figure 5:
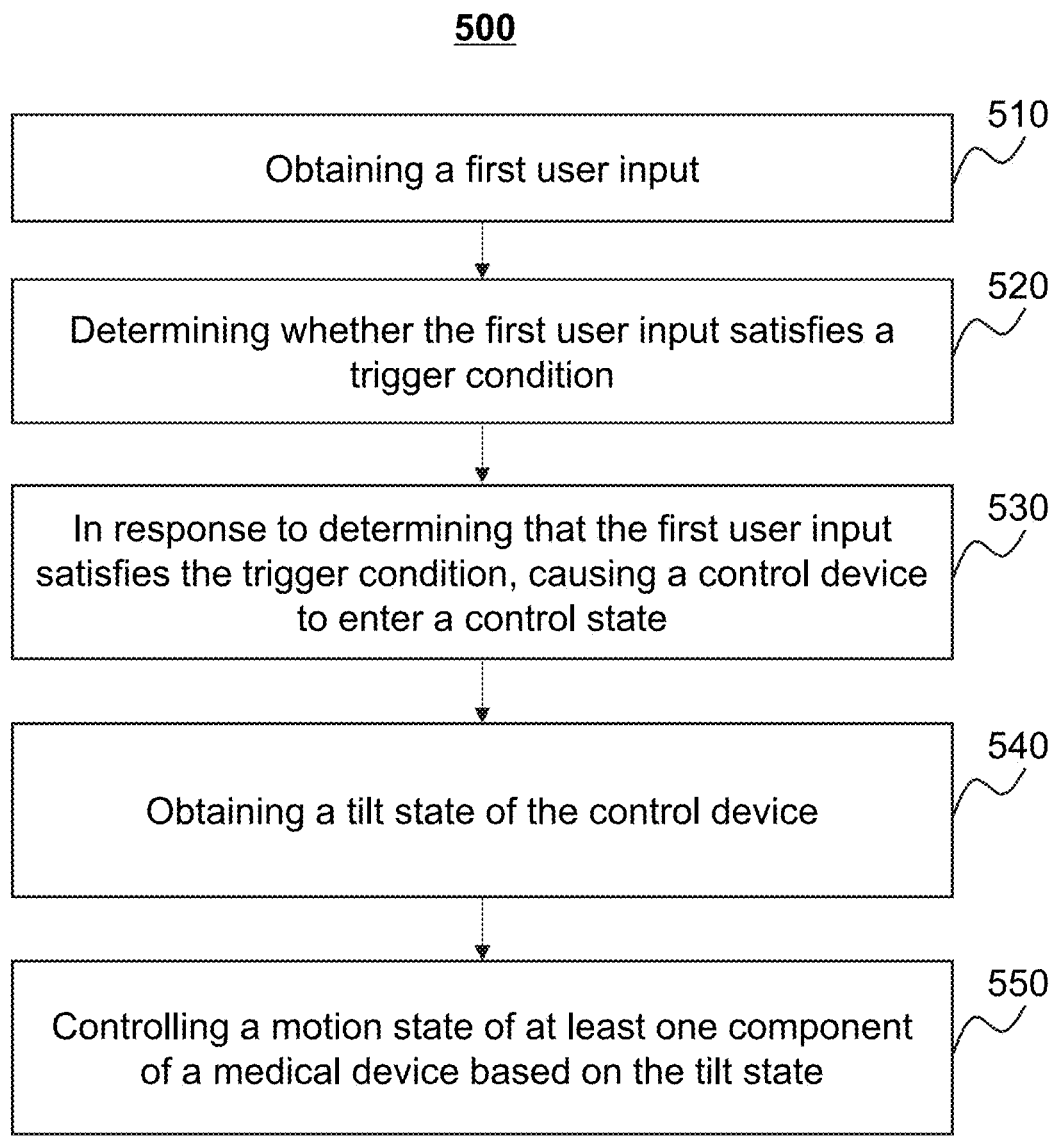
FIG. 5 is a flowchart illustrating an exemplary process for controlling a medical device according to some embodiments of the present disclosure.

In some embodiments, the control device 160 may also include a processor, a display device, a voice collection device (e.g., a microphone), an image collection device (e.g., a camera), at least one first key, at least one second key, or the like, or any combination thereof. The display device may be configured to display information or data. For example, the display device may display the patient information, the motion states of the components of the medical device 110, etc. The voice collection device may be configured to collect a voice of the user. The image collection device may be configured to capture an image of the user. The processor may be configured to perform methods (e.g., the process 500 as shown in FIG. 5) for controlling the medical device 110 as described elsewhere in the present disclosure. In some embodiments, the control device 160 may communicate with other components (e.g., the medical device 110) of the medical system 100 via a wired network or a wireless network. More descriptions of the control device 160 may be found elsewhere in the present disclosure (e.g., FIGS. 5-9 and descriptions thereof).

In some embodiments, a coordinate system 170 may be provided for the medical device 110 to define a position of a component (e.g., an absolute position, a position relative to another component) of the medical device 110 and/or a movement of the component. For example, the coordinate system 170 may include an X-axis, a Y-axis, and a Z-axis. The X-axis and the Y-axis may be horizontal axes, and the Z-axis may be a vertical axis. As shown in FIG. 1, a positive direction of the Y-axis may be a direction from a left side to a right side of the treatment bed viewed from the direction facing the front of the medical device 110; a positive direction of the X-axis may be a direction in which the treatment bed is moved from an inside to an outside of the medical device 110; a positive direction of the Z-axis may be a direction from a upper part of the medical device 110 to a lower part of the medical device 110 (or the floor where the medical device 110 stands). The coordinate system 170 may be provided for illustrative purposes only. For example, the coordinate system 170 may further include other coordinate axes. As another example, the directions of the X-axis, the Y-axis and the Z-axis may be other directions, which are not limited in the present disclosure.

It should be noted that the above description is provided for illustrative purposes only and is not intended to limit the scope of the present disclosure. Those of ordinary skills in the art can make various changes and modifications under the guidance of the contents of the present disclosure. The features, structures, methods, and other features of the exemplary embodiments described herein may be combined in various ways to obtain additional and/or alternative exemplary embodiments. However, these changes and modifications do not depart from the scope of the present disclosure.

FIG. 2 is a schematic diagram illustrating an exemplary computing device on which at least a part of a medical system may be implemented according to some embodiments of the present disclosure. As shown in FIG. 2, a computing device 200 may include a processor 210, a storage device 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process data or information obtained from the medical device 110, the storage device 150, the terminal 130 and/or any other components of the medical system 100. In some embodiments, the processor 210 may include one or more hardware processors, such as a microcontroller, a microprocessor, a reduced instruction set computer (RISC), an application specific integrated circuit (ASIC), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage device 220 may store the data/information obtained from the medical device 110, the storage device 150, the terminal 130, the control device 160 and/or any other components of the medical system 100. In some embodiments, the storage device 220 may include a mass memory, a removable memory, a volatile read-and-write memory, a read-only memory, or the like, or any combination thereof. For example, the mass memory may include a magnetic disk, an optical disk, a solid-state drive, etc. The removable memory may include a flash drive, a floppy disk, an optical disk, a memory card, a compact disk, a tape, etc. The volatile read-write memory may include a random-access memory (RAM). The RAM may include a dynamic RAM (DRAM), a double rate synchronous dynamic RAM (DDR SDRAM), a static RAM (SRAM), a thyristor RAM (T-RAM), and a zero capacitor RAM (Z-RAM), etc. The ROM may include a mask ROM (MROM), a programmable ROM (PROM), an erasable programmable ROM (EPROM), an electrically erasable programmable ROM (EEPROM), a compact disc ROM (CD-ROM), and a digital multi-function disk ROM, etc. In some embodiments, the storage device 220 may store one or more programs and/or instructions to perform exemplary methods as described in the present disclosure.

The I/O 230 may input and/or output signals, data, information, etc. In some embodiments, the I/O 230 may enable a user interaction with the processing device 140. In some embodiments, the I/O 230 may include an input device and an output device. Exemplary input device may include a keyboard, a mouse, a touch screen, a microphone, or the like, or any combination thereof. Exemplary output device may include a display device, a speaker, a printer, a projector, or the like, or any combination thereof. Exemplary display device may include a liquid crystal display (LCD), a light emitting diode (LED) based display, a flat panel display, a curved screen, a television device, a cathode ray tube (CRT), a touch screen, or the like, or any combination thereof.

The communication port 240 may be connected to a network (e.g., the network 120) to facilitate data communications. The communication port 240 may establish connections between the processing device 140 and the medical device 110, the control device 160, the storage device 150, and/or the terminal 130. The connection may be a wired connection, a wireless connection, any other communication connection that can enable data transmission and/or reception, and/or any combination of these connections. The wired connection may include, for example, an electrical cable, a fiber optic cable, a telephone wire, or the like, or any combination thereof. The wireless connection may include, for example, a Bluetooth, a Wi-Fi, a WiMax, a WLAN, a ZigBee, a mobile network (e.g., 3G, 4G, 5G), or the like, or any combination thereof. In some embodiments, the communication port 240 may be and/or include a standardized communication port, e.g., an RS232, an RS485, etc. In some embodiments, the communication port 240 may be a specially designed communication port. For example, the communication port 240 may be designed in accordance with the digital imaging and communications in medicine (DICOM) protocol.

FIG. 3 is a schematic diagram illustrating exemplary hardware and/or software components of an exemplary mobile device on which a terminal may be implemented according to some embodiments of the present disclosure. As shown in FIG. 3, a mobile device 300 may include a communication platform 310, a display 320, a graphic processing unit (GPU) 330, a central processing unit (CPU) 340, an input/output (I/O) 350, a memory 360, and a storage 390. In some embodiments, any other suitable components, including but not limited to a system bus or a controller (not shown), may also be included in the mobile device 300. In some embodiments, a mobile operation system 370 (e.g., iOS™, Android™, Windows Phone™) and one or more applications 380 may be loaded from the storage 390 into the memory 360 in order to be executed by the CPU 340. The applications 380 may include a browser or any other suitable mobile applications for receiving and rendering information related to medical system 100 or other information obtained from the processing device 140. User interactions with the information stream may be achieved through the I/O 350, and provided to the processing device 140 and/or other components of the medical system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed.

Figure 4:
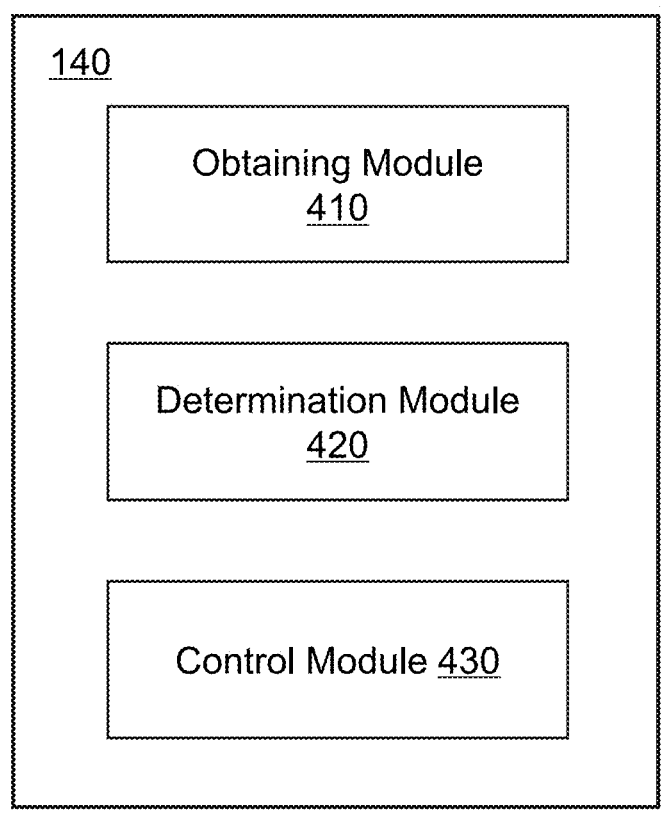
FIG. 4 is a block diagram illustrating an exemplary processing device 140 according to some embodiments of the present disclosure.

FIG. 4 is a block diagram illustrating an exemplary processing device 140 according to some embodiments of the present disclosure. The processing device 140 may include an obtaining module 410, a determination module 420, and a control module 430.

The obtaining module 410 may obtain data and/or information associated with the medical system 100. The data and/or the information associated with the medical system 100 may include a user input, a trigger condition, a tilt state of the control device 160, detection data of an inertial sensor, mechanical parameters of one or more components of the medical device 110, a motion state (e.g., a motion speed, a motion direction), or the like, or any combination thereof. For example, the obtaining module 410 may obtain a first user input. More descriptions for obtaining the first user input may be found elsewhere in the present disclosure (e.g., operation 510 and descriptions thereof). As another example, the obtaining module 410 may obtain a second user input. More descriptions for obtaining the second user input may be found elsewhere in the present disclosure (e.g., operation 550 and descriptions thereof). As another example, the obtaining module 410 may obtain the tilt state of the control device 160. More descriptions for obtaining the tilt state of the control device 160 may be found elsewhere in the present disclosure (e.g., operation 540 and descriptions thereof). In some embodiments, the obtaining module 410 may obtain the data and/or the information associated with the medical system 100 from one or more other components (e.g., the medical device 110, the control device 160, the storage device 150) of the medical system 100.

The determination module 420 may determine data and/or information associated with the medical system 100. In some embodiments, the determination module 420 may determine whether a first user input satisfies a trigger condition. For example, the trigger condition may be that the first user input includes a selection of at least one first key. As another example, the trigger condition may be related to a time length of the at least one first key being selected by the user. As another example, the trigger condition may be related to a number of strikes to the at least one first key by the user in a certain period. As another example, the trigger condition may be a voice instruction input by the user that satisfies a certain condition. As another example, the trigger condition may be a specific gesture of a user, a specific expression of a user, a specific posture of a user, a specific password, or the like, or any combination thereof. More descriptions for determining whether the first user input satisfies the trigger condition may be found elsewhere in the present disclosure (e.g., operation 520 and description thereof).

The control module 430 may control states of one or more components of the medical system 100. In some embodiments, the control module 430 may control a state of the control device 160. For example, in response to determining that a first user input satisfies a trigger condition, the control module 430 may control the control device 160 to enter a control state. More descriptions of the control state may be found elsewhere in the present disclosure (e.g., operation 530 and description thereof). In some embodiments, the control module 430 may control a state of at least one component of the medical device 110. For example, the control module 430 may control a motion state (e.g., a motion direction, a motion speed) of the at least one component of the medical device 110. More descriptions for controlling the motion state of the at least one component may be found elsewhere in the present disclosure (e.g., operation 550 and description thereof).

It should be noted that the above description of the processing device 140 in the present disclosure is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may further include a storage module (not shown in the figures) for data storage. As another example, the obtaining module 410 and the determining module 420 may be integrated into a single module.

FIG. 5 is a flowchart illustrating an exemplary process for controlling a medical device according to some embodiments of the present disclosure. In some embodiments, at least a part of process 500 may be executed by the processing device 140 (e.g., implemented in the computing device 200 as shown in FIG. 2) or by the control device 160 (e.g., a processor of the control device 160). For example, the process 500 may be stored in a storage device (e.g., the storage device 150, the storage device 220, the storage 390) in a form of instructions (e.g., an application program), and may be retrieved and/or executed by the processing device 140 (e.g., the processor 210 shown in FIG. 2, the CPU 340 shown in FIG. 3, or one or more modules in the processing device 140 shown in FIG. 4) or the control device 160. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 140 (e.g., the obtaining module 410) or the control device 160 may obtain a first user input.

Figure 7:
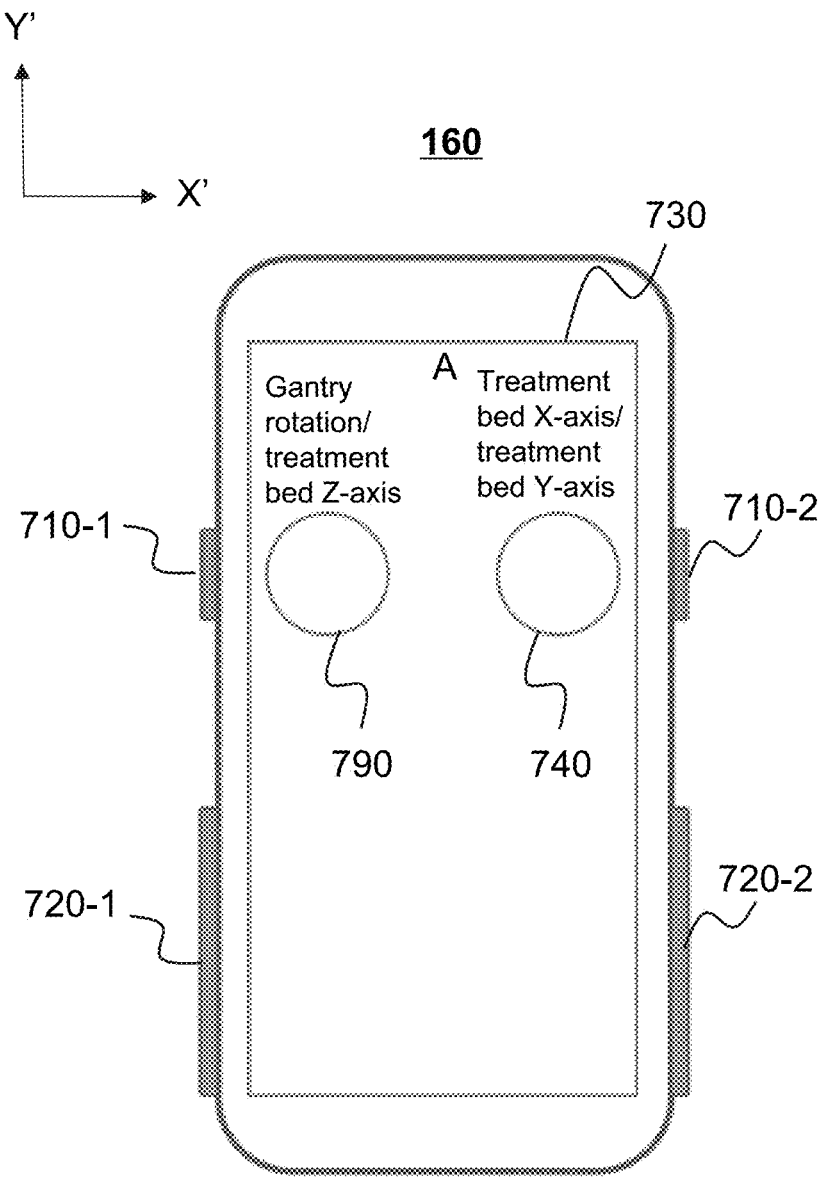
FIG. 7 is a schematic diagram illustrating an interface of an exemplary control device according to some embodiments of the present disclosure.

In some embodiments, the first user input may be data and/or information input by a first user via the control device 160. The first user may be an operator (e.g., a doctor, a nurse, a technician) of the medical device (e.g., a radiotherapy device). In some embodiments, the control device 160 may include at least one first key. The first key may be a physical key, a touch key, etc. The first key may be configured at any position on the control device 160. The first user input may be a selection (e.g., pressing) of the at least one first key by the first user. For example, the first keys may be physical keys disposed on both sides below the control device 160 (e.g., a first key 720-1 and a first key 720-2 as shown in FIG. 7). When the first user holds the control device 160 in the right hand or the left hand, the first user's palm and four fingers except the thumb may press the first keys on the both sides of the control device 160. In some embodiments, the control device 160 may be configured with a voice collection device (e.g., a microphone). The first user input may be a voice issued by the first user. In some embodiments, the control device 160 may be configured with a touch screen that receives the first user input in a form of a touch, a gesture, etc. The first user input may be a gesture operation of the first user. In some embodiments, the control device 160 may be configured with an image capture device (e.g., a camera). The first user input may be a posture or an expression of the first user.

In 520, the processing device 140 (e.g., the determination module 420) or the control device 160 may determine whether the first user input satisfies a trigger condition. The trigger condition may be a condition for determining whether the processing device 140 or the control device 160 can perform a control operation.

In some embodiments, the trigger condition may be that the first user input includes a selection of the at least one first key. For example, the control device 160 may include multiple first keys, and the trigger condition may be that at least one of the multiple first keys is selected or all of the multiple first keys are selected. Specifically, two first keys (e.g., the first key 720-1 and the first key 720-2 shown in FIG. 7) are disposed on the two sides of the control device 160. When the two first keys are pressed, it may be determined that the trigger condition is satisfied. That is, when the two first keys are both in a selected state (e.g., being pressed), it may be determined that the trigger condition is satisfied. When one or both of the first keys are released (e.g., not being pressed), it may be determined that the trigger condition is no longer satisfied.

In some embodiments, the trigger condition may be related to a time length of the at least one first key being selected by the first user. In some embodiments, the trigger condition may be that the first user presses the at least one first key for a time length equal to or greater than a first threshold. The first threshold may be 1 second, 1.5 seconds, 2 seconds, 2.5 seconds, 3 seconds, or any suitable value. For example, when the two first keys (e.g., the first key 720-1 and the first key 720-2 shown in FIG. 7) are pressed at the same time for longer than 5 seconds, it may be determined that the trigger condition is satisfied.

In some embodiments, the trigger condition may be related to a number of strikes to the at least one first key by the first user in a certain time period. In some embodiments, the trigger condition may be that the number of strikes to the at least one first key by the first user within a certain time period is equal to or greater than a second threshold. The second threshold may be 1, 2, 3, or any suitable value. For example, when the number of strikes to the first key is greater than twice within 2 seconds, it may be determined that the trigger condition is satisfied. The first threshold and/or the second threshold may be set manually, or may be determined by one or more components (e.g., the processing device 140) of the medical system 100 according to different situations.

In some embodiments, the first user input may be a voice instruction issued by the first user. The trigger condition may be the voice instruction input by the first user that satisfies a certain condition. The first user may be a user authorized to control the medical device 110. The condition may include that the voice instruction is from the first user. The processing device 140 may determine whether the voice instruction is from the first user. The determination may be made based on biological information of a sender of a voice instruction, including, for example, one or more of a voiceprint, a facial feature, a fingerprint, etc. For example, the processing device 140 may compare a voice (or one or more features thereof) to a voiceprint (or one or more features thereof) of an authorized user stored in a storage device by analyzing a voiceprint of the voice instruction. As another example, the processing device 140 may receive an image (e.g., a facial photo) of the sender of the voice instruction, and determine whether the received voice instruction of the first user is from the authorized user through a face recognition. When it is determined that the received voice instruction is from the authorized user, the processing device 140 may analyze the content of the voice instruction to determine whether the trigger condition is satisfied. For illustration purposes, a voice condition may be a preset piece of text. For example, the voice condition may be "enter the control state," and when the first user makes a sound including "enter the control state," it may be determined that the trigger condition is satisfied. In some embodiments, the trigger condition may further be a specific gesture, a specific expression, a specific posture, a specific password, etc. of the first user, or any combination thereof.

In 530, in response to determining that the first user input satisfies the trigger condition, the processing device 140 (e.g., the control module 430) or the control device 160 may cause the control device 160 to enter a control state.

As used herein, "the control device 160 is in a control state" may refer to that the control device 160 is in a state that can control other devices (e.g., components of the medical device 110). In some embodiments, when the control device 160 enters the control state, the processing device 140 may start to obtain a tilt state of the control device 160, and the tilt state of the control device 160 may be used to control the medical device 110. That is, when the control device 160 is not in the control state, the processing device 140 may not obtain the tilt state of the control device 160, or the tilt state of the control device 160 obtained by the processing device 140 at this time may not be used to control the medical device 110.

In some embodiments, the control device 160 may include an inertial sensor. The inertial sensor may continuously collect detection data, and the detection data may be used to determine the tilt state of the control device 160. When the control device 160 enters the control state, the detection data collected by the inertial sensor may be used to control the medical device 110. When the control device 160 is not in the control state, the detection data collected by the inertial sensor may not be used to control the medical device 110, or the inertial sensor may stop collecting the detection data.

According to some embodiments of the present disclosure, a determination may be made as whether the control device 160 enters the control state by determining whether the first user input satisfies the trigger condition, which may prevent the user from triggering the operation by mistake and ensure a safety of a radiotherapy operation.

In 540, the processing device 140 (e.g., the obtaining module 410) or the control device 160 may obtain a tilt state of the control device 160.

Figure 6:
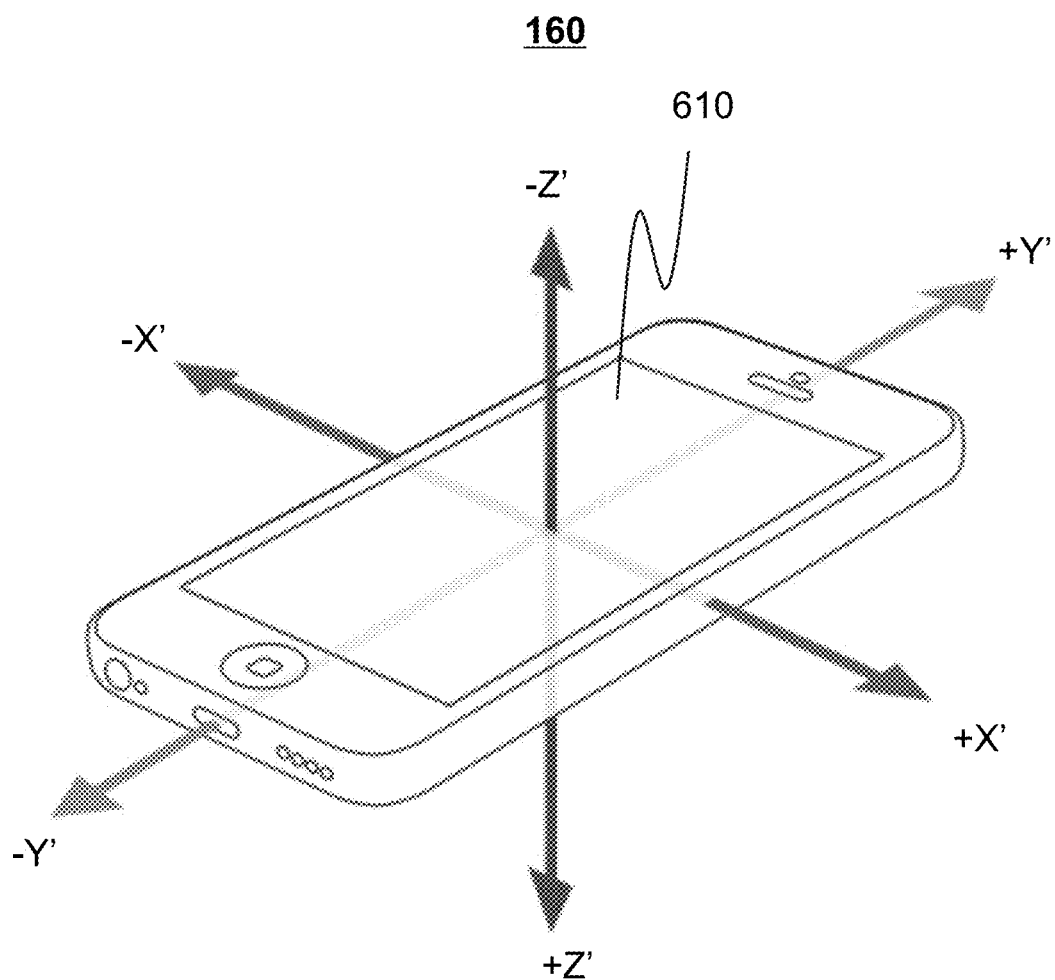
FIG. 6 is a schematic diagram illustrating an exemplary control device according to some embodiments of the present disclosure.

In some embodiments, the tilt state may include a tilt direction, a tilt angle, etc. As used herein, the tilt state of the control device 160 may refer to a tilt state of a reference plane of the control device 160 (e.g., a front surface 610 of the control device 160 as shown in FIG. 6). For example, as shown in FIG. 6, the control device 160 may be tilted clockwise or counterclockwise around the Y'-axis, clockwise or counterclockwise around the X'-axis, clockwise or counterclockwise around the Z'-axis, etc. In some embodiments, the tilt angle of the control device 160 may not exceed a preset threshold. For example, the tilt angle of the control device 160 may not exceed 90°. When the tilt angle of the control device 160 exceeds 90°, a direction of an acceleration of the control device 160 collected by the inertial sensor may change (e.g., a sign of the acceleration may change from a positive sign to a negative sign), thereby changing a motion direction of a corresponding component. In some embodiments, if the tilt angle of the control device 160 exceeds the preset threshold, the control device 160 may send a prompt to the user to remind the user to adjust the tilt angle in time. In some embodiments, the X'-axis, the Y'-axis and the Z'-axis shown in FIG. 6 may correspond to the X-axis, the Y-axis and the Z-axis shown in FIG. 1.

In some embodiments, the control device 160 may include the inertial sensor. The processing device 140 may determine the tilt state of the control device 160 based on the detection data of the inertial sensor. For example, the processing device 140 may obtain the detection data of the inertial sensor. In some embodiments, the inertial sensor may be an acceleration sensor (e.g., a three-axis acceleration sensor). The detection data of the acceleration sensor may include acceleration information of the control device 160 in three axis directions (e.g., the X' axis, the Y' axis, and the Z' axis as shown in FIG. 6). The acceleration information may include a value of the acceleration and a direction of the acceleration. For example, as shown in FIG. 6, when the control device 160 is placed on a horizontal plane and the front surface of the control device 160 is upward, the detection data of the acceleration sensor may be: $a_x=0$, $a_y=0$, $a_z=+9.8$ m/s$^2$, wherein $a_x$, $a_y$ and $a_z$ are gravitational acceleration information of the control device 160 on the X'-axis, the Y'-axis and the Z'-axis, respectively. The sign of the acceleration may indicate the direction of the acceleration. For example, a positive sign may indicate that the acceleration is along a positive direction of a coordinate axis, and a negative sign may indicate that the acceleration is along a negative direction of the coordinate axis. When the user tilts the control device 160 clockwise or counterclockwise around the Y'-axis, the value of the gravitational acceleration of the control device 160 on the X'-axis may increase, and the greater the tilt angle is, the more the value of the gravitational acceleration of the control device 160 on the X'-axis increases. For example, when the control device 160 is tilted 90° clockwise around the Y'-axis, the value of the gravitational acceleration of the control device 160 on the X'-axis may be ax=9.8 m/s². When the user picks up the control device 160 and tilts it clockwise or counterclockwise around the X'-axis, the value of the gravitational acceleration of the control device 160 on the Y'-axis may increase. For example, when the control device 160 is tilted 90° clockwise around the X'-axis, the value of the gravitational acceleration of the control device 160 on the Y'-axis may be ay=9.8 m/s².

Further, the processing device 140 may determine the tilt state of the control device 160 based on the detection data of the inertial sensor. For example, the inertial sensor may be the acceleration sensor. The processing device 140 may determine the tilt angle of the control device 160 based on the acceleration value of the control device 160 collected by the acceleration sensor. The processing device 140 may determine the tilt direction of the control device 160 based on the acceleration direction of the control device 160 collected by the acceleration sensor. As another example, the inertial sensor may be the gyroscope. The gyroscope may collect an angular speed of the control device 160. The processing device 140 may integrate the angular speed of the control device 160 collected by the gyroscope with time, to determine the tilt angle of the control device 160.

In some embodiments, the tilt state of the control device 160 may be evaluated relative to a particular initial state. For example, when it is determined that the first user input satisfies the trigger condition, it may further be determined whether the control device 160 is in the initial state. In some embodiments, the initial state of the control device 160 may be a horizontal state with the front surface of the control device 160 facing up, that is, a reference plane of the control device 160 (e.g., the front surface 610 of the control device 160 shown in FIG. 6) may be parallel or substantially parallel to a horizontal plane. As used herein, "substantially" refers to that a deviation is below a threshold (e.g., 5%, 10%, 15%, 20%, 30%). For example, "a first plane is substantially parallel to a second plane" may refer to that an angle between the first plane and the second plane is less than 5°, less than 3°, or less than 1°, etc. In some embodiments, the detection data collected by the inertial sensor may be used to determine whether the control device 160 is in the initial state. For example, a determination may be made as whether a difference between a gravitational acceleration of the control device 160 on the Z'-axis and +9.8 m/s² is smaller than a gravitational acceleration threshold (e.g., 0.1 m/s², 0.2 m/s², 0.5 m/s²). In response to determining that the difference between the gravitational acceleration of the control device 160 on the Z'-axis and +9.8 m/s² is less than the acceleration threshold, it may be determined that the control device 160 is in the initial state, and at this time the control device 160 may enter the control state. In some embodiments, in response to determining that the first user input satisfies the trigger condition and the control device 160 is not in the initial state, one or more components (e.g., the control device 160) of the medical system 100 may issue a prompt to the user to remind the user to adjust the state of the control device 160.

In some cases, when the control device 160 is in a non-initial state (e.g., a tilt state), if the control device 160 directly enters the control state, the gravitational acceleration of the control device 160 in a certain direction is not 0 at this time. After entering the control state, a corresponding component may move suddenly, which may be dangerous. According to some embodiments of the present disclosure, only when the control device 160 is in the initial state (horizontal state) and the first user input satisfies the trigger condition, the control device 160 may enter the control state, which may improve the operation safety of the medical device.

In some embodiments, the tilt state of the control device 160 may be evaluated relative to a reference state, and it is unnecessary to determine whether the control device 160 is in a specific initial state. Only when it is determined that the first user input satisfies the trigger condition, the control device 160 may directly enter the control state. For example, the processing device 140 may determine a state of the control device 160 at the time of obtaining the first user input as the reference state. The processing device 140 may determine the tilt state of the control device 160 based on the reference state of the control device 160. The processing device 140 may control the motion state of the at least one component of the medical device based on the tilt state of the control device 160. Merely by way of example, when it is determined that the first user input satisfies the trigger condition, and the state of the control device 160 is that tilted 10° clockwise around the Y'-axis, the processing device 120 may designate the state of the control device 160 at this time as the reference state of the control device 160. When the control device 160 enters the control state and the user performs a tilt operation on the control device 160, and the state of the control device 160 obtained by the processing device 140 is that tilted 50° clockwise around the Y'-axis, the processing device 140 may determine that the tilt state of the control device 160 is that tilted 40° clockwise around the Y'-axis (i.e., 50°–10°=40°).

According to some embodiments of the present disclosure, by considering the state of the control device 160 at the time of the first user input as the reference state, the control device 160 may no longer be required to be in a horizontal state. When it is determined that the first user input satisfies the trigger condition, the control device 160 may directly enter the control state, thereby facilitating the user operation. The user may flexibly select whether the control device 160 is in the horizontal state as the trigger condition for the control device 160 to enter the control state according to the actual needs. The tilt direction and the tilt angle of the control device 160 may be determined based on the horizontal plane, or may be determined based on a plane where the control device 160 is located when the first user input is obtained.

In 550, the processing device 140 (e.g., the control module 430) or the control device 160 may control a motion state of at least one component of the medical device based on the tilt state. The motion state may include a motion direction and/or a motion speed.

In some embodiments, the processing device 140 may obtain a second user input. The processing device 140 may control the motion state of the at least one component of the medical device based on the second user input and the tilt state. In some embodiments, the second user input may be data and/or information input by a second user via the control device 160. The second user may be an operator (e.g., a doctor, a nurse, a technician) of the medical device (e.g., a radiotherapy device). The second user and the first user may be the same user or different users. In the present disclosure, the first user and the second user may be collectively referred to as the user.

In some embodiments, the control device 160 may include at least one second key. The second key may be a physical key, a touch key, etc. The second key may be configured at any position on the control device 160. The second user input may be a selection (e.g., pressing) of the at least one second key by the user. For example, the second keys may be physical keys disposed on both sides above the control device 160 (e.g., a second key 710-1 and a second key 710-2 shown in FIG. 7). When the user holds the control device 160 in the right hand or the left hand, the user's palm and three fingers except the thumb and the forefinger may press the first keys on the both sides below the control device 160 (e.g., the first key 720-1 and the first key 720-1 as shown in FIG. 7). At this time, the user's forefinger and thumb may press the second keys on the both sides above the control device 160.

In some embodiments, the second user input may be related to the motion of the component of the medical device 110 that the user needs to control. For example, the medical device may be a radiotherapy device. The radiotherapy device may include a treatment bed, a gantry, a collimator, etc. The motion of the component of the radiotherapy device may include a translation motion of the treatment bed along a first axis (e.g., the X-axis shown in FIG. 1), a translation motion of the treatment bed along a second axis (e.g., the Y-axis shown in FIG. 1), a translation motion of the treatment bed along a third axis (e.g., the Z-axis shown in FIG. 1), a rotation motion of the treatment bed around a rotation axis of the treatment bed, a rotation motion of the gantry around a rotation axis of the gantry, a rotation motion of the collimator around a rotation axis of the collimator, or the like, or any combination thereof.

In some embodiments, one second key of the control device 160 may correspond to motions of one or more components of the medical device 110. For example, one second key of the control device 160 may correspond to one or more motions of a component. As another example, one second key of the control device 160 may correspond to various motions of multiple components. Merely by way of example, the second key 710-1 shown in FIG. 7 may correspond to the rotation motion of the gantry around the rotation axis of the gantry and the translation motion of the treatment bed along the third axis, and the second key 710-2 may correspond to the translation motion of the treatment bed along the first axis and the translation motion of the treatment bed along the second axis. After the processing device 140 obtains the second user input associated with the second key, the tilt state of the control device 160 obtained by the processing device 140 may be used to control the motions of the one or more components of the medical devices 110. In some embodiments, in response to the selection of the at least one of the at least one second key by the user, the processing device 140 may determine at least one motion of at least one component to be controlled from the at least one component of the medical device 110. The processing device 140 may control the motion state of the at least one motion of the at least one component to be controlled based on the tilt state of the control device 160. For example, the processing device 140 may determine the motion direction of the at least one motion of the at least one component to be controlled based on the tilt direction of the control device 160. The processing device 140 may determine the motion speed of the at least one motion of the at least one component to be controlled based on the tilt angle of the control device 160. Merely by way of example, when the user selects the second key 710-1 (e.g., presses the second key 710-1), the tilt state of the control device 160 obtained by the processing device 140 at this time may be used to control the translation motion of the treatment bed along the third axis and the rotation motion of the gantry around the gantry rotation axis corresponding to the second key 710-1. At this time, the control device 160 tilts around the Y' axis in a clockwise or counterclockwise direction may control the rotation motion of the gantry around the gantry rotation axis. The control device 160 tilts around the X'-axis in a clockwise or counterclockwise direction may control the translation motion of the treatment bed along the third axis.

In some embodiments, the processing device 140 may determine the motion direction of the at least one component based on the second user input and the tilt direction of the control device 160. For example, assuming that the second user input corresponds to the translation motion of the treatment bed along the first axis, the processing device 140 may control the motion direction of the translation motion of the treatment bed along the first axis based on the tilt direction of the control device 160. For example, the processing device 140 may determine the motion direction of the translation motion of the treatment bed along the first axis based on the tilt direction of the control device 160 and a corresponding relationship between the tilt direction of the control device 160 and the motion direction of the treatment bed. The corresponding relationship between the tilt direction of the control device 160 and the motion direction of the treatment bed may be preset by the user. Merely by way of example, when the tilt direction of the control device 160 is that tilting clockwise around the Y'-axis, it may be determined that the motion direction of the translation motion of the treatment bed along the first axis is the positive direction of the first axis (e.g., the positive direction of the X-axis shown in FIG. 1). When the tilt direction of the control device 160 is that tilting counterclockwise around the Y'-axis, it may be determined that the motion direction of the translation motion of the treatment bed along the first axis is the negative direction of the first axis (e.g., the negative direction of the X-axis shown in FIG. 1). As another example, assuming that the second user input corresponds to the rotation motion of the gantry around the gantry rotation axis, the processing device 140 may control the motion direction of the rotation motion of the gantry around the gantry rotation axis based on the tilt direction of the control device 160. When the tilt direction of the control device 160 is that tilting clockwise around the Y' axis, it may be determined that the gantry rotates clockwise around the gantry rotation axis. When the tilt direction of the control device 160 is that tilting counterclockwise around the Y' axis, it may be determined that the gantry rotates counterclockwise around the gantry rotation axis.

The processing device 140 may determine the motion speed of the at least one component based on the second user input and the tilt angle of the control device 160. It is assumed that the motion of the component to be controlled of the medical device 110 corresponding to the second user input is the translation motion of the treatment bed along the first axis, the processing device 140 may control the motion speed of the translation motion of the treatment bed along the first axis based on the tilt angle of the control device 160. For example, the processing device 140 may determine the motion speed of the translation motion of the treatment bed along the first axis based on the tilt angle of the control device 160 and a corresponding relationship between the tilt angle of the control device 160 and the motion speed of the treatment bed. The corresponding relationship between the tilt angle of the control device 160 and the motion speed of the treatment bed may be preset by the user. In some embodiments, the tilt angle of the control device 160 may be proportional to the motion speed of the treatment bed. Merely by way of example, when the tilt angle of the control device 160 is that tilting 10° clockwise around the Y'-axis, it may be determined that the motion speed of the translation motion of the treatment bed along the positive direction of the first axis is 0.1 m/s When the tilt angle of the control device 160 is adjusted to be that tilting 20° clockwise around the Y'-axis, the motion speed of the translation motion of the treatment bed along the positive direction of the first axis may be adjusted to 0.2 m/s.

In some embodiments, the processing device 140 may determine whether the tilt angle of the control device 160 is greater than or equal to an angle threshold. The angle threshold may be set by the user, or may be a default value configured in the system determined by one or more components (e.g., the processing device 140) of the medical system 100 according to different situations. For example, the angle thresholds preferred by different users may be stored in one or more components (e.g., the storage device 150) of the medical system 100 in advance. The processing device 140 may obtain the angle threshold corresponding to a current user from the storage device according to information of the current user of the control device 160. For example, the angle threshold may be 90°. In response to determining that the tilt angle is greater than or equal to the angle threshold, the motion speed of the at least one component may be controlled to be a preset speed. The preset speed may be set by the user, or may be determined by one or more components (e.g., the processing device 140) of the medical system 100 according to different situations. The preset speed may be the maximum motion speed of the component expected by the user. Merely by way of example, assuming that the angle threshold is 90°, and the preset speed of a component is 0.5 m/s, when the tilt angle of the control device 160 is greater than 90°, the component may always move at the preset speed.

In some embodiments, the processing device 140 may determine an acceleration of an acceleration process of a corresponding component from a static state to a motion state based on a speed of the control device 160 converting from an initial state to a tilted state. For example, the faster the control device 160 converts from the initial state to the tilted state, the greater the acceleration of the acceleration process of the treatment bed from the static state to the translation motion state along the first axis. In some embodiments, the acceleration of the acceleration process of the component from the static state to the motion state may be preset by the user. For example, the treatment bed may perform a uniform acceleration motion with a constant acceleration.

In some embodiments, when the treatment bed moves to a target position, the user may recover the control device 160 from the tilted state to the initial state. In some embodiments, an acceleration of a deceleration process of a corresponding component from a motion state to a static state may be determined based on a speed of the control device 160 recovering from the tilted state to the initial state. For example, the faster the control device 160 recovers from the tilted state to the initial state, the greater the acceleration of the deceleration process of the treatment bed from the translation motion state to the static state along the first axis. In some embodiments, the acceleration of the deceleration process of the component from the motion state to the static state may be preset by the user. For example, the treatment bed may perform a uniform deceleration motion with a constant acceleration.

In some embodiments, when the component moves to a target position, the medical system 100 may send a prompt to the user to remind the user that the component has reached the target position. In response to the prompt, the user may stop the control operation on the component. The prompt may be in a form of a sound, a text, an image, etc. In some embodiments, when the component moves to the target position, the component may automatically stop moving. For example, after the component moves to the target position, the processing device 140 (or the control device 160) may no longer obtain the tilt state of the control device 160. As another example, after the component moves to the target position, the processing device 140 (or the control device 160) may no longer send a motion control signal to the component. As another example, after the component moves to the target position, the component may no longer respond to the motion control signal sent by the processing device 140 (or the control device 160). In some embodiments, the target position of the component may be set by the user, or may be a system default value set by one or more components (e.g., the processing device 140) of the medical system 100 according to different situations.

In some embodiments, the control device 160 may have a single-motion mode and a multi-motion mode. In the single-motion mode, the control device 160 may only control a motion state of a motion of a corresponding component along a single axis direction at a time. As used herein, "a motion of a component along a single axis direction" may refer to a motion of the component along a predetermined axis. The predetermined axis may be the X-axis, the Y-axis and the Z-axis in the coordinate system 170 as shown in FIG. 1. The motion along the predetermined axis may be a translation motion along the X-axis direction, the Y-axis direction, and the Z-axis direction, or a rotation motion around the X-axis direction, the Y-axis direction, and the Z-axis direction. For example, the translation motion of the treatment bed along the X-axis, the Y-axis, or the Z-axis, respectively, may be considered as the motion of the treatment bed along the single axis. Motions of the treatment bed along other directions (e.g., any direction between the X-axis and the Y-axis) may not be considered as the motion of the treatment bed along the single axis, and may be considered as a combined motion of motions along multiple axis directions (e.g., a combined motion of motions along the X-axis direction and the Y-axis direction). In some embodiments, a direction and a number (or count) of predetermined axis may be not limited to the X-axis, the Y-axis, and the Z-axis shown in FIG. 1, and there may be any number of predetermined axis in different directions. Merely by way of example, when the user tilts the control device 160 in a certain direction at a certain angle, and after completing the control of the motion state of the corresponding component (e.g., the rotation motion of the gantry around the gantry rotation axis), the control device 160 may need to be recovered to the initial state, and then may be tilted in other directions to control the motion states of other components (e.g., the translation motion of the treatment bed along the first axis). In some embodiments, the motion state of which component may be controlled by the control device 160 at a certain time may be designated by a second key of the control device 160.

In the multi-motion mode, the control device 160 may simultaneously control motion states corresponding to multiple motions of multiple components, or motion states of multiple motions of one component along multiple axes. For example, assuming that the control device 160 tilts clockwise or counterclockwise around the Y'-axis correspond to the rotation motion of the gantry around the gantry rotation axis, and the control device 160 tilts clockwise or counterclockwise around the X'-axis correspond to the translation motion of the treatment bed along the third axis, the user may tilt the control device 160 around the Y'-axis and the X'-axis simultaneously. Accordingly, the treatment bed may translate along the first axis while the gantry rotates around the gantry rotation axis. In some embodiments, the user may set the motion mode according to an actual need (e.g., a safety factor, an actual motion need), so as to facilitate the user operation.

In some embodiments, the control device 160 may include a vibration device. The vibration device may include a motor, a haptic device, etc. Taking the vibration device as a motor as an example, in some embodiments, a vibration frequency and/or a vibration amplitude generated by the motor may be related to the tilt state of the control device 160. For example, the vibration frequency and/or the vibration amplitude generated by the motor may be proportional to the tilt angle of the control device 160. In some embodiments, the vibration frequency and/or the vibration amplitude generated by the motor may be related to the motion state of the component. For example, the vibration frequency and/or the vibration amplitude generated by the motor may be proportional to the motion speed of the component.

For example, when the control device 160 is placed on a horizontal plane with the front surface of the control device 160 facing up, the motor may not generate the vibration. When the user picks up the control device 160 for a tilting operation, the motor may start to generate the vibration. The greater the tilt angle is, the faster the motion speed of the corresponding component is, and the higher the vibration frequency or the greater the vibration amplitude generated by the motor is. When the tilt angle of the control device 160 exceeds an angle threshold, that is, when the component reaches a preset speed (e.g., the maximum motion speed), the motor may continuously vibrate. By configuring the motor in the control device 160, the user may be reminded of the current tilt angle of the control device 160, and the current motion speed of the corresponding component. In some cases, the user may unconsciously tilt the control device 160 to a great extent, and the vibration of the motor may be set to remind the user to adjust the tilt angle in time, so as to avoid danger.

It should be noted that the above description of the present disclosure is provided for the purpose of illustration only, and is not intended to limit the scope of the present disclosure. Those skilled in the art may make various changes and modifications based on the description of the present disclosure. However, these changes and modifications do not depart from the scope of the present disclosure. In some embodiments, in response to determining that the first user input does not satisfy the trigger condition, the control device 160 may not enter the control state, and the processing device 140 (or the control device 160) may continuously obtain the first user input until it is determined that the first user input satisfies the trigger condition, and then the control device 160 may enter the control state.

In some embodiments, one or more of operations 510-530 may be omitted. For example, operations 510-530 may be omitted. The processing device 140 may not need to obtain the first user input and/or the second user input. The processing device 140 (or the control device 160) may obtain the tilt state of the control device 160 via the inertial sensor. The processing device 140 (or the control device 160) may control the motion state of the at least one component of the medical device based on the tilt state. As another example, operation 520 and operation 530 may be omitted. The processing device 140 may not need to determine whether the first user input satisfies the trigger condition. After the processing device 140 obtains the first user input, the control device 160 may enter the control state.

It should be noted that the directions and the number of the coordinate axes (e.g., the X-axis, the Y-axis, the Z-axis) shown in FIG. 1 and the coordinate axes (e.g., the X'-axis, the Y'-axis, the Z'-axis) shown in FIG. 6 are provided for illustrative purposes only and are not intended to limit the scope of the present disclosure. In some embodiments, the control device 160 may be tilted around any other axis, and the corresponding component may be moved along an axial direction of any other axis.

Figure 8:
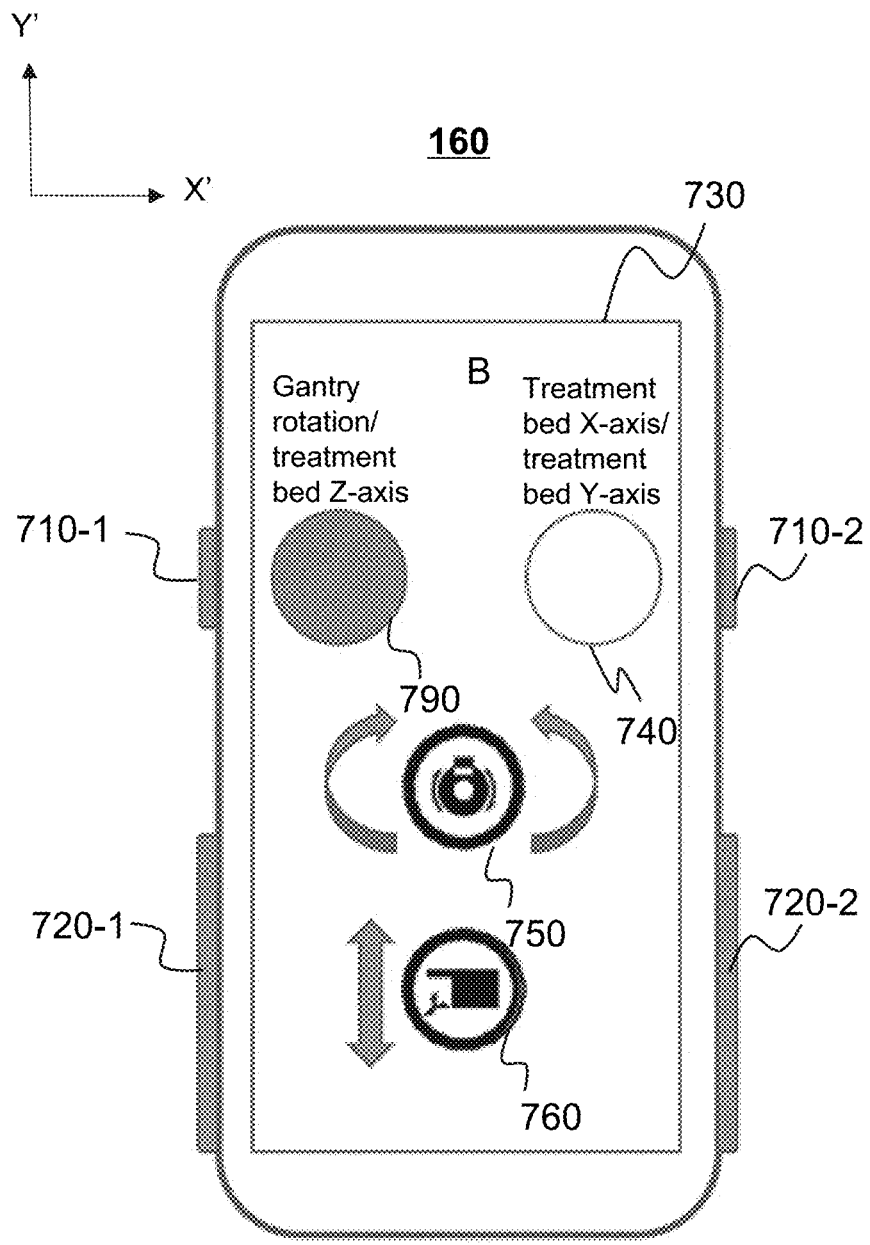
FIG. 8 is a schematic diagram illustrating an interface of an exemplary control device according to some embodiments of the present disclosure.
Figure 9:
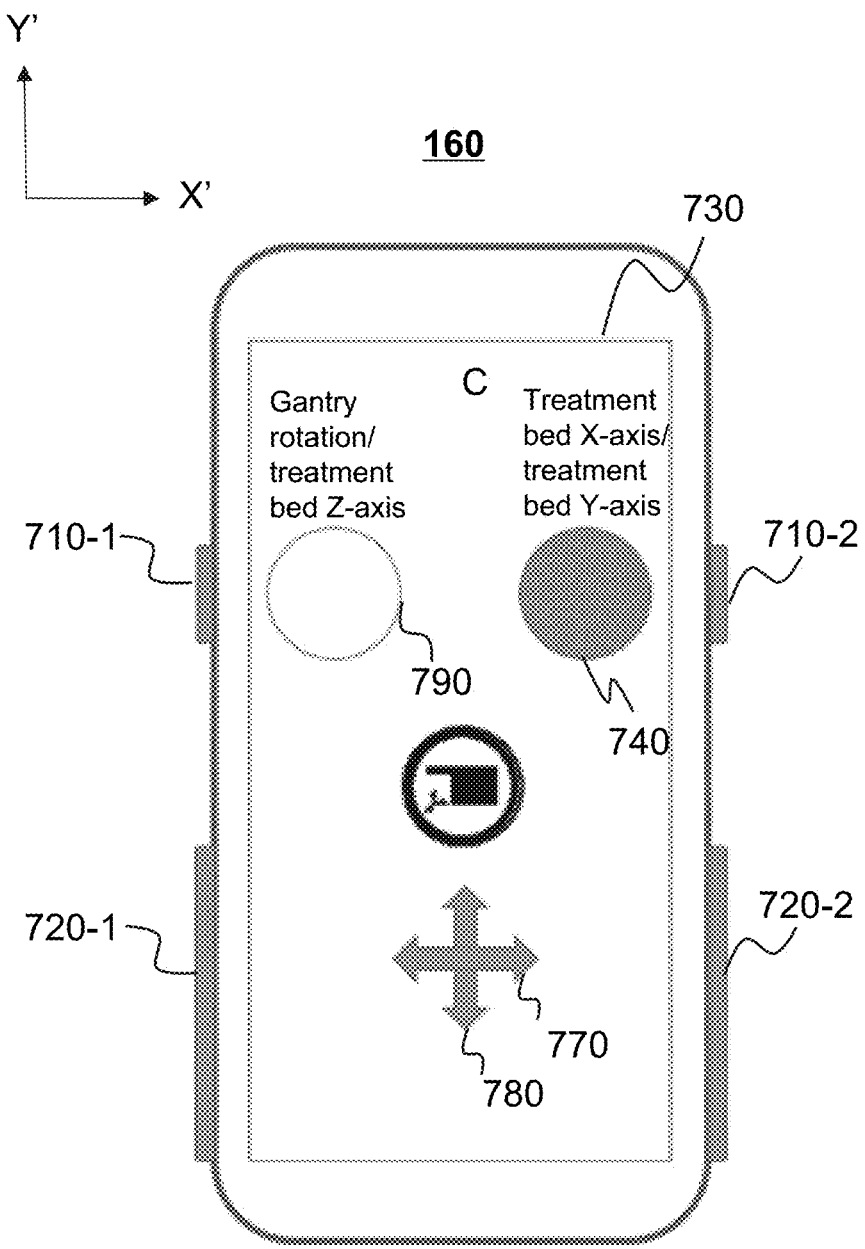
FIG. 9 is a schematic diagram illustrating an interface of an exemplary control device according to some embodiments of the present disclosure.

FIGS. 7-9 are schematic diagrams illustrating interfaces of exemplary control devices according to some embodiments of the present disclosure.

As shown in FIGS. 7-9, the control device 160 may include an inertial sensor (not shown in the figures), a display device 730, at least one first key (e.g., a first key 720-1, a first key 720-2), and at least one second key (e.g., a second key 710-1, a second key 710-2). The at least one first key (e.g., the first key 720-1, the first key 720-2) may be used to cause the control device 160 to enter a control state. The at least one first key may be located at any position on the control device 160. For example, the first key 720-1 and the first key 720-2 may be located on both sides below the control device 160. The at least one second key (e.g., the second key 710-1, the second key 710-2) may be used to select a motion of at least one component to be controlled of the medical device. The at least one second key may be located at any position on the control device 160. For example, the second key 710-1 and the second key 710-2 may be located on both sides above the control device 160. The at least one first key and the at least one second key may be physical keys or touch keys. The at least one first key and the at least one second key may have any shape and any size.

In some embodiments, when the at least one first key is selected, the control device 160 may enter the control state, and the display device 730 may display a first interface. The first interface may include at least one icon to be selected. The at least one icon to be selected may correspond to the at least one second key. For example, when both the first key 720-1 and the first key 720-2 are selected by the user, it may be determined that the trigger condition is satisfied, and the control device 160 may enter the control state. After the control device 160 enters the control state, the display device 730 may display a first interface A, as shown in FIG. 7. The first interface A may be used to remind the user to select the motion of the at least one component to be controlled of the medical device via the second key 710-1 and the second key 710-2. For example, a first motion icon 790 and a second motion icon 740 may appear on the first interface A. The first motion icon 790 may correspond to the second key 710-1, and the second motion icon 740 may correspond to the second key 710-2. The first motion icon 790 may correspond to a rotation motion of a gantry around a gantry rotation axis and a translation motion of a treatment bed along the third axis (e.g., the Z-axis shown in FIG. 1). The second motion icon 740 may correspond to a translation motion of the treatment bed along the first axis (e.g., the X-axis shown in FIG. 1) and a translation motion of the treatment bed along the second axis (e.g., the Y-axis shown in FIG. 1).

In some embodiments, when at least one of the at least one second key is selected, the display device 730 may display a second interface for indicating the motion of the at least one component to be controlled of the medical device. For example, when the user presses the second key 710-1, the display device 730 may display a second interface B, as shown in FIG. 8. The second interface B may be used to indicate the motion of the at least one component to be controlled of the medical device. For example, in the second interface B, the first motion icon 790 may be lighted up, and a first indicator icon 750 and a second indicator icon 760 may appear in the second interface B. The first indicator icon 750 and the second indicator icon 760 may indicate the component to be controlled and/or the motion direction. The first indicator icon 750 and the second indicator icon 760 may indicate the rotation motion of the gantry around the gantry rotation axis and the translation motion of the treatment bed along the third axis corresponding to the second key 710-1, respectively. For example, the first indicator icon 750 may be used to indicate the user that tilting the control device 160 around the Y'-axis (clockwise or counterclockwise) can control the rotation motion of the gantry around the gantry rotation axis (clockwise or counterclockwise). The second indicator icon 760 may be used to indicate the user that tilting the control device 160 around the X'-axis (clockwise or counterclockwise) can control the translation motion of the treatment bed along the third axis (in positive or negative direction).

Similarly, when the user presses the second key 710-2, the display device 730 may display a third interface C, as shown in FIG. 9. For example, in the third interface C, the second motion icon 740 may be lighted up, and a third indicator icon 770 and a fourth indicator icon 780 may appear in the third interface C. Alternatively, the third indicator icon 770 and the fourth indicator icon 780 may indicate the moving component and/or the motion direction. The third indicator icon 770 and the fourth indicator icon 780 may indicate the translation motion of the treatment bed along the first axis and the translation motion of the treatment bed along the second axis corresponding to the second key 710-2, respectively. For example, the third indicator icon 770 may be used to indicate the user that tilting the control device 160 around the Y'-axis (clockwise or counterclockwise) can control the translation motion of the treatment bed along the first axis (in the positive or the negative direction). The fourth indicator icon 780 may be used to indicate the user that tilting the control device 160 around the X'-axis (clockwise or counterclockwise) can control the translation motion of the treatment bed along the second axis (in the positive or the negative direction).

It should be noted that the above description of the present disclosure is provided for the purpose of illustration only, and is not intended to limit the scope of the present disclosure. Those skilled in the art can make various changes and modifications based on the description of the present disclosure. However, these changes and modifications do not depart from the scope of the present disclosure. For example, the control device 160 may have any size and any shape. As another example, the display device 730 may have any size and any shape. As another example, the control device 160 may include any number of first keys and any number of second keys. As another example, the motion icons and the indicator icons may be in any form, and may have any size or any shape. The motion icons and the indicator icons may be displayed at any position on the interface of the control device 160. As another example, the control device 160 may further include keys with other functions other than the first keys and the second keys. As another example, the control device 160 may further include a voice collection device (e.g., a microphone), an image collection device (e.g., a camera), etc.

It should be noted that the above description of the present disclosure is only described by taking the controlling a radiotherapy device as an example. In some embodiments, the control method described in the present disclosure may further be used to control a motion state of other medical device (e.g., a medical surgical robot). In some embodiments, the control method described in the present disclosure may further be applied to other fields besides the medical field. For example, the control method described in the present disclosure may be used to control a motion state of a movable device such as a wheelchair, a vehicle (e.g., an unmanned vehicle), an aircraft (e.g., a drone), a boat, etc.

Compared with prior arts, the possible beneficial effects of the embodiments of the present disclosure may include but are not limited to the followings. (1) The inertial sensor (e.g., the acceleration sensor, the gyroscope sensor) may be used to replace the toggle button of the traditional control device (e.g., the hand control box of the radiotherapy device), the user may no longer need to confirm the toggle button with the naked eyes, and may only need to control the tilt direction and tilt angle of the control device to control the motion state (e.g., the motion direction, the motion speed) of the component of the medical device, which may be convenient for the user to perform blind operations. (2) The user may select the single-motion mode and the multi-motion mode according to an actual need. In the single-motion mode, the motion state of one component may be controlled at a time. In the multi-motion mode, the motion states of multiple components may be controlled at a time. (3) The vibration device (e.g., a linear motor) may be configured in the control device, and when the user does not look at the control device, the tilt state (e.g., the tilt angle) of the control device and the motion state (e.g., the motion speed) of the component may be sensed through the vibration of the vibration device. (4) The existing inertial sensor may have a high degree of integration, a single chip may implement corresponding functions, and a volume of the hand control box may be relatively small. (5) The control device may not have a mechanical motion component (e.g., the toggle button), and the service life may be extended. It should be noted that different embodiments may produce different beneficial effects. In different embodiments, the beneficial effects that may be produced may be any one or any combination of the above or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for controlling a radiotherapy device, comprising:
    obtaining a first user input;
    determining whether the first user input satisfies a trigger condition;

in response to determining that the first user input satisfies the trigger condition, causing handheld device to enter a control state;

obtaining a tilt state of the handheld device; and controlling, based on the tilt state, a motion state of at least one of a treatment bed and a gantry of the radiotherapy device, the motion state including at least one of a motion direction and a motion speed.

2. The method of claim 1, wherein the handheld device includes at least one first key, and the determining whether the first user input satisfies a trigger condition comprises:

determining whether the first user input is a selection of the at least one first key.

3. The method of claim 1, wherein the handheld device includes at least one second key, and the controlling, based on the tilt state, a motion state of at least one of a treatment bed and a gantry of the radiotherapy device comprises:

obtaining a second user input for selecting at least one of the at least one second key; and controlling, based on the second user input and the tilt state, the motion state of the at least one of the treatment bed and the gantry of the radiotherapy device.

4. The method of claim 3, wherein the tilt state includes a tilt direction and/or a tilt angle, and the controlling, based on the second user input and the tilt state, the motion state of the at least one of the treatment bed and the gantry of the radiotherapy device comprises:

determining, based on the second user input and the tilt direction, the motion direction of the at least one of the treatment bed and the gantry of the radiotherapy device; and/or determining, based on the second user input and the tilt angle, the motion speed of the at least one of the treatment bed and the gantry of the radiotherapy device.

5. The method of claim 4, wherein the determining, based on the second user input and the tilt angle, the motion speed of the at least one of the treatment bed and the gantry of the radiotherapy device comprises:

determining whether the tilt angle is greater than or equal to an angle threshold; and in response to determining that the tilt angle is greater than or equal to the angle threshold, determining the motion speed of the at least one of the treatment bed and the gantry of the radiotherapy device as a preset speed.

6. The method of claim 1, wherein the handheld device includes a vibration device, and the motion speed of the at least one-component of the treatment bed and the gantry of the radiotherapy device is represented by a vibration frequency and/or a vibration amplitude of the vibration device.

7. The method of claim 6, wherein the vibration frequency and/or the vibration amplitude of the vibration device is proportional to a tilt angle of the handheld device, and the vibration device vibrates continuously in response to determining that the motion speed of the at least one of the treatment bed and the gantry of the radiotherapy device reaches a preset speed.

8. The method of claim 1, wherein the in response to determining that the first user input satisfies the trigger condition, causing a handheld device to enter a control state comprises:

determining whether the handheld device is in an initial state; and in response to the determining that the handheld device is in the initial state and the first user input satisfies the trigger condition, causing the handheld device to enter the control state.

9. The method of claim 1, wherein the controlling, based on the tilt state, a motion state of at least one of a treatment bed and a gantry of the radiotherapy device comprises:

obtaining a state of the handheld device at a time of the first user input as a reference state;

determining the tilt state of the handheld device based on the reference state; and controlling the motion state of the at least one of the treatment bed and the gantry of the radiotherapy device based on the tilt state.

10. The method of claim 1, wherein the handheld device includes an inertial sensor, and the obtaining a tilt state of the handheld device comprises:

obtaining detection data of the inertial sensor; and determining the tilt state of the handheld device based on the detection data.

11. The method of claim 1, wherein the method further comprising:

determining an acceleration of the at least one of the treatment bed and the gantry of the radiotherapy device from a static state to the motion state based on a speed of the handheld device converting from an initial state to the tilt state; and determining an acceleration of the at least one of the treatment bed and the gantry of the radiotherapy device from the motion state to the static state based on a speed of the handheld device recovering from the tilt state to the initial state.

12. The method of claim 1, wherein the handheld device includes at least one first key, at least one second key, and at least one inertial sensor, wherein the at least one first key is configured to cause the handheld device to enter the control state, the at least one second key is configured to select a motion of the at least one of the treatment bed and the gantry of the radiotherapy device, and the at least one inertial sensor is configured to collect detection data, the detection data being used to determine the tilt state of the handheld device.

13. The method of claim 12, wherein the tilt state includes a tilt angle, and the method further comprises:

in response to determining that the tilt angle of the handheld device exceeds a preset threshold, changing the motion of the at least one of the treatment bed and the gantry of the radiotherapy device based on a change of a direction of an acceleration of the handheld device collected by the at least one inertial sensor.

14. The method of claim 13, wherein the preset threshold is determined according to information of a current user of the handheld device, and the handheld device is tilted clockwise or counterclockwise around a first axis, a second axis, and a third axis.

15. The method of claim 12, wherein the at least one first key is physical key disposed on both sides below the handheld device, and the trigger condition includes at least one of:

a condition that a user presses the at least one first key for a time length equal to or greater than a first threshold; and a condition that a number of strikes to the at least one first key by the user within a certain time period is equal to or greater than a second threshold.

16. The method of claim 12, wherein
the at least one second key is physical key disposed on both sides above the handheld device, one of the at least one second key corresponding to a rotation motion of the gantry around a rotation axis and a translation motion of the treatment bed along a third axis, and another one of the at least one second key corresponding to the translation motion of the treatment bed along a first axis and the translation motion of the treatment bed along a second axis.

17. The method of claim 16, wherein the handheld device includes a display device, wherein
in response to determining that the handheld device enters the control state, the display device displays a first interface including at least one icon to be selected, the at least one icon to be selected corresponding to the at least one second key, and the at least one icon to be selected including a first motion icon and a second motion icon, wherein the first motion icon corresponds to the rotation motion of the gantry around the rotation axis and the translation motion of the treatment bed along the third axis, and the second motion icon corresponds to the translation motion of the treatment bed along the first axis and the translation motion of the treatment bed along the second axis;
in response to determining that the first motion icon is lighted up, the display device displays a second interface including a first indicator icon and a second indicator icon, wherein the first indicator icon and the second indicator icon indicate the rotation motion of the gantry around the gantry rotation axis and the translation motion of the treatment bed along the third axis, respectively; and
in response to determining that the second motion icon is lighted up, the display device displays a third interface including a third indicator icon and a fourth indicator icon, wherein the third indicator icon and the fourth indicator icon indicate the translation motion of the treatment bed along the first axis and the translation motion of the treatment bed along the second axis, respectively.

18. A medical system, wherein the system comprises:
a radiotherapy device including a treatment bed and a gantry;
a handheld device including at least one inertial sensor;
at least one processor;
at least one storage medium configured to store instructions, and when performing the instructions, the at least one processor causes the system to perform operations comprising:
obtaining, by the at least one inertial sensor, a tilt state of the handheld device; and
controlling a motion state of at least one of the treatment bed and the gantry of the radiotherapy device based on the tilt state, the motion state including at least one of a motion direction and a motion speed.

19. The system of claim 18, wherein the handheld device has a single-motion mode and a multi-motion mode, wherein
in response to determining that the handheld device enters into the single-motion mode, the handheld device controls a motion state of a corresponding component along a single axis direction at a time, and the handheld device is recovered to an initial state after completing the control of the motion state of the treatment bed or the gantry; and
in response to determining that the handheld device enters into the multi-motion mode, the handheld device controls motion states of multiple motions of the treatment bed and the gantry, or motion states of multiple motions of the treatment bed or the gantry along multiple axis directions at a time.

20. The method of claim 1, wherein
the handheld device includes at least one first key and at least one second key,
the at least one first key is configured to cause the handheld device to enter the control state,
the at least one second key is configured to control a rotation motion of the gantry around a rotation axis and a translation motion of the treatment bed along a first axis, a second axis, and a third axis.

* * * * *